US008214488B2

(12) United States Patent
Machida

(10) Patent No.: US 8,214,488 B2
(45) Date of Patent: Jul. 3, 2012

(54) RESOURCE INFORMATION PROVIDING SYSTEM, METHOD, RESOURCE INFORMATION PROVIDING APPARATUS, AND PROGRAM

(75) Inventor: Fumio Machida, Tokyo (JP)

(73) Assignee: NEC Corporation, Tokyo ( * ) Notice: Subject to any disclaimer, the term of this patent is extended or adjusted under 35 U.S.C. 154(b) by 676 days.

(21) Appl. No.: 12/513,220

(22) PCT Filed: Nov. 6, 2007

(86) PCT No.: PCT/JP2007/071563
§ 371 (c)(1),
(2), (4) Date: May 1, 2009

(87) PCT Pub. No.: WO2008/056670
PCT Pub. Date: May 15, 2008

(65) Prior Publication Data
US 2010/0076973 A1    Mar. 25, 2010

(30) Foreign Application Priority Data
Nov. 6, 2006   (JP) ................................. 2006-300200

(51) Int. Cl.
*G06F 15/173* (2006.01)
(52) U.S. Cl. ....................................... 709/224; 707/736
(58) Field of Classification Search .................. 709/224; 707/736
See application file for complete search history.

(56) References Cited

U.S. PATENT DOCUMENTS
8,060,064 B2 * 11/2011 Khoury et al. ............. 455/412.2
2007/0005755 A1 * 1/2007 Humphries .................. 709/224

FOREIGN PATENT DOCUMENTS

| JP | 2000047912 A | 2/2000 |
|---|---|---|
| JP | 2001022612 A | 1/2001 |
| JP | 2001306511 A | 11/2001 |
| JP | 2004145536 A | 5/2004 |
| JP | 2004178118 A | 6/2004 |
| JP | 2004206495 A | 7/2004 |
| JP | 2005250521 A | 9/2005 |
| JP | 2005352985 A | 12/2005 |
| WO | 2006046486 A | 5/2006 |

OTHER PUBLICATIONS

International Search Report for PCT/JP2007/071563 mailed Dec. 11, 2007.
K. Czajkowski, et al., "Grid Information Services for Distributed Resource Sharing", 10th IEEE International Symposium on High Performance Distributed Computing, 2001, p. 1-14.

* cited by examiner

*Primary Examiner* — Patrice Winder
*Assistant Examiner* — Tauqir Hussain

(57) ABSTRACT

In a resource information providing system in which resource information providing apparatuses which periodically collect pieces of resource information of a management target apparatus and stores the pieces of information in a cache are hierarchized, when an elapsed time specifying request specifying maximum allowable elapsed time with respect to the resource information is input from a request source which requests the resource information, the resource information providing apparatus obtains the maximum elapsed time from acquisition of the resource information by the management target apparatus until arrival thereof to the request source and determines whether it is exceeding the maximum allowable elapsed time input from the request source or not. If it is exceeding, the resource information providing apparatus shortens the collection interval thereof by the time obtained by subtracting the maximum allowable elapsed time from the maximum elapsed time.

13 Claims, 18 Drawing Sheets

FIG. 2

501 UPDATE INTERVAL OF RESOURCE INFORMATION

| IDENTIFIER OF RESOURCE INFORMATION r_i | UPDATE INTERVAL |
|---|---|
|  |  |
|  |  |
| ⋮ | ⋮ |

502

CONCURRENT UPDATE PROCESSING NUMBER MCU

503

POLLING TIME INTERVAL PI

FIG. 3

501 COLLECTION SCHEDULE

| IDENTIFIER OF RESOURCE INFORMATION r_i | UPDATE INTERVAL PC VALUE (IntervalPC(r_i)) | NEXT PC VALUE (NextPC(r_i)) |
|---|---|---|
|  |  |  |
|  |  |  |
| ⋮ | ⋮ | ⋮ |

FIG. 4

| IDENTIFIER OF RESOURCE INFORMATION r_i | VALUE |
|---|---|
|  |  |
|  |  |
| ⋮ | ⋮ |

FIG. 12

| RESOURCE INFORMATION | Interval PC | NextPC |
|---|---|---|
| resource01 | 3 | 1 |
| resource02 | 3 | 2 |
| resource03 | 3 | 3 |
| resource04 | 5 | 1 |
| resource05 | 5 | 2 |
| resource06 | 5 | 3 |
| resource07 | 7 | 1 |
| resource08 | 7 | 2 |
| resource09 | 7 | 3 |

RESOURCE INFORMATION PROVIDING SYSTEM, METHOD, RESOURCE INFORMATION PROVIDING APPARATUS, AND PROGRAM

This application is the National Phase of PCT/JP2007/071563, filed Nov. 6, 2007, which claims priority based on Japanese Patent Application No. 2006-300200 filed on Nov. 6th 2006, and the disclosure thereof is expressly incorporated herein in its entirety.

TECHNICAL FIELD

The present invention relates to a resource information providing system which collects and accumulates the pieces of information about resources such as calculators distributed over a wide area (hereinafter, referred to as resource information) and provides the resource information to a search request source.

BACKGROUND ART

Along with advancement of distribution and complexity of information systems, increase of the system operation management cost has become a problem. Therefore, an operation management system in which a management system collects and stores pieces of resource information about various resources such as calculators and network devices, and operation and control of the system is carried out based on the stored pieces of resource information is provided.

For example, the management system collects the pieces of resource information from management target systems such as network systems and Web systems, stores the pieces of information, and compares the resource information with performance deterioration conditions. Thus, an example of the operation management system in which the management system automatically detects performance deterioration phenomena of the management target systems is disclosed in Patent Literature 1.

Generally, in an information system, the resource information owned by the management target systems is always updated. Therefore, the management system has to keep collecting the resource information owned by the management target systems. This is for the reason that, when the management system uses old resource information, the system is operated or controlled based on wrong judgement.

Therefore, in the system disclosed in Patent Literature 1 and in many other operation management systems, the management system collects the pieces of resource information, which is owned by the management target systems, at intervals periodically specified in advance.

Moreover, for example, a management system groups resource information for each type of management target systems, and update intervals and concurrent update numbers are set for the resource information groups. Then, the management system generates a collection schedule, which satisfies the update intervals under the restriction of the concurrent update number, for each resource information group. In accordance with the generated collection schedule, the management system collects pieces of resource information and updates a cache. Then, in accordance with a search request, the management system searches the cache and provides the corresponding resource information to a search request source. This operation management system is disclosed in Patent Literature 2.

On the other hand, a MDS (Monitoring Discovery System) is disclosed in Non-Patent Literature 1 as an operation management system of a wide-area distributed system. In the MDS, resource information is managed by directories. When a search process for searching the resource information is executed, the management system acquires the resource information and stores it in a cache. Then, when the resource information stored in the cache and the resource information required by the search request source is the same, the management system provides the resource information stored in the cache to the request source. Thus, the time of searching the resource information is shortened. Time of validity of the cache is set in advance for the resource information collected by the MDS. Therefore, when the search request source requests the resource information of which time of validity has been expired, the management system discards the resource information stored in the cache and executes a process of acquiring latest resource information. The MDS can be subjected to hierarchical cooperation of a plurality of MDSs, and they are utilized in systems of various modes including a single cluster to a large scale distribution system.

Patent Literature 1: Unexamined Japanese Patent Application KOKAI Publication No. 2004-145536
Patent Literature 2: International Publication WO2006/046486A1
Non-Patent Literature 1: Grid information services for distributed resource sharing Czajkowski, K.; Fitzgerald, S.; Foster, I.; Kesselman, C.; High Performance Distributed Computing, 2001. Proceedings, 10th IEEE International Symposium on, 7-9 Aug. 2001

DISCLOSURE OF INVENTION

In a system which collects resource information from many management target apparatuses distributed over a wide area, when resource information providing apparatuses, which collect the resource information from the management target apparatuses and provides the resource information to a search request source, are hierarchized in many levels, the resource information goes through a plurality of the resource information providing apparatuses until the resource information reaches the search request source. Therefore, the freshness of the resource information which reaches the search request source is a problem.

Conventionally, like the system disclosed in Patent Literature 2, there has been a system in which the collection interval at which each of the resource information providing apparatuses collects resource information is set in accordance with the freshness required by the search request source.

However, the mechanism of ensuring the freshness of the resource information which has reached the search request source has not been present in the system in which the resource information providing apparatuses are hierarchized in many levels. Therefore, the search request source has been unable to acquire the resource information at desired freshness.

It is an object of the present invention to provide a resource information providing system in which resource information providing apparatuses are hierarchized in many levels, the resource information providing system capable of adjusting the freshness of resource information provided to a search request source so as to satisfy the freshness required by the search request source, and to provide a method thereof.

In addition, it is another object to provide the resource information providing system capable of reducing collection load as much as possible within the range that satisfies the freshness required by the search request source and to provide a method thereof.

In order to achieve the above described objects, a resource information providing system according to a first aspect of the present invention is characterized by having a management target apparatus storing pieces of resource information;

a plurality of resource information providing apparatuses periodically collecting the resource information from the management target apparatus, storing the pieces of resource information, and being hierarchized on a transmission path of the resource information from the management target apparatus to a request source which requests the resource information; and a control means of, when maximum elapsed time from acquisition of the resource information by the management target apparatus until arrival of the information to the request source is exceeding maximum allowable elapsed time specified by the request source, shortening a collection interval, at which the resource information providing apparatus collects the pieces of resource information from the management target apparatus, by the time obtained by subtracting the maximum allowable elapsed time from the maximum elapsed time.

In order to achieve the above described objects, a resource information providing system according to a second aspect of the present invention is characterized by having a management target apparatus storing pieces of resource information;

a plurality of resource information providing apparatuses periodically collecting the resource information from the management target apparatus, storing the pieces of resource information in a cache, and being hierarchized on a transmission path of the resource information from the management target apparatus to a request source which requests the resource information; and a control means of, when maximum elapsed time from acquisition of the resource information by the management target apparatus until arrival of the information to the request source is exceeding maximum allowable elapsed time specified by the request source, selecting the resource information providing apparatus capable of shortening a collection interval, at which the resource information providing apparatus collects the pieces of resource information from the management target apparatus, by at least the time obtained by subtracting the maximum allowable elapsed time from the maximum elapsed time and shortening the collection interval of the resource information in the selected resource information providing apparatus.

For example, it is permissible that when a time interval of activating an information collecting process by polling is PI, a number of activation of polling is PC, a PC value of next update is NextPC(r_i), and an update interval PC value for repeating update is IntervalPC(r_i);

resource information r_i is collected by any of polling processes;

the resource information providing apparatus has a collection schedule storing means of storing, as a collection schedule, NextPC(r_i) and IntervalPC(r_i) simultaneously satisfying a concurrent update processing restriction and an update interval of the information providing apparatus, the concurrent update processing restriction restricting a maximum value of the number of pieces of resource information collected in one polling to equal to or less than an upper limit value, which is set in advance; and the control means shortens IntervalPC(r_i) of the resource information in the selected resource information providing apparatus.

For example, it is permissible that the resource information providing system has a collection schedule generating means which sorts the pieces of resource information having same values of the update intervals into same groups, respectively, and generates a collection schedule for the groups, respectively, the collection schedules are of the resource information belonging to the groups; and the control means generates the collection schedules again by the collection schedule generating means.

For example, it is permissible that the collection schedule generating means examines whether the maximum value of the number of pieces of resource information collected in one polling in the generated collection schedule is equal to or less than the upper limit value which is set in advance or not.

For example, it is permissible that the collection schedule generating means imparts serial label values p to the resource information belonging to each group and causes a remainder, which is obtained by dividing the label value p by the update interval of the group, to serve as NextPC(r_i) corresponding to the resource information r_i having the label value p.

For example, it is permissible that the values of the update intervals owned by the resource information are restricted to be relatively prime.

For example, it is permissible that the value of the update interval owned by the resource information is a prime number.

For example, it is permissible that the collection schedule generating means imparts order to the groups in the ascending order of the values of the update intervals owned by the groups, generates collection schedules of the groups in the ascending order of the imparted order, and utilizes empty space, which is generated in the collection schedule of the group having k as the value of the update interval, in generation of a collection schedule of the group having a value of the update interval which is an integral multiple of k.

In order to achieve the above described objects, a resource information providing method according to a third aspect of the present invention is a resource information providing method of a resource information providing system in which a plurality of resource information providing apparatuses are hierarchized, the resource information providing apparatuses periodically collecting pieces of resource information stored in a management target apparatus and accumulating the pieces of information in a cache, the resource information providing method including a first step of determining whether maximum elapsed time from acquisition of the resource information by the management target apparatus until arrival of the information to a request source requesting the resource information is exceeding maximum allowable elapsed time, which is specified by the request source, or not by a control means; and a second step of, when the maximum elapsed time is determined to be exceeding the maximum allowable elapsed time by the control means, selecting a resource information providing apparatus from the plurality of resource information providing apparatuses present on a transmission path of the resource information to the request source, the selected resource information providing apparatus being capable of shortening a collection interval, at which the resource information providing apparatus collects the pieces of resource information from the management target apparatus, by the time obtained by subtracting the maximum allowable elapsed time from the maximum elapsed time, and shortening the collection interval of the resource information in the selected resource information providing apparatus.

In order to achieve the above described objects, a resource information providing apparatus according to a fourth aspect of the present invention is a resource information providing apparatus periodically collecting resource information of a management target apparatus and accumulating the information in a cache, the resource information providing apparatus is characterized by having a determination means of determining whether maximum elapsed time from acquisition of the resource information by the management target apparatus until arrival of the information to a request source via the resource information providing apparatus is exceeding the maximum allowable elapsed time or not; and a changing means of, when the maximum elapsed time is determined to be exceeding the maximum allowable elapsed time by the determination means, determining whether a collection interval of the resource information in the resource information providing apparatus can be shortened at least by the time obtained by subtracting the maximum allowable elapsed time from the maximum elapsed time or not, and, when the collection interval can be shortened, shortening the collection interval of the resource information; wherein when the resource information is acquired from other resource information providing apparatus and it is determined by the determination means that the collection interval of the resource information cannot be shorted, the changing means transmits a collection interval shortening request to the other resource information providing apparatus, the collection interval shortening request requesting to shorten the collection interval, at which the resource information is collected by the other resource information providing apparatus, by the time obtained by subtracting the maximum allowable elapsed time from the maximum elapsed time.

In order to achieve the above described objects, a program according to a fifth aspect of the present invention causes a computer of a resource information providing apparatus, which periodically collects pieces of resource information of a management target apparatus and accumulates the information in a cache, to function as a determination means of determining whether maximum elapsed time from acquisition of the resource information by the management target apparatus until arrival of the information to a request source requesting the resource information via the resource information providing apparatus is exceeding the maximum allowable elapsed time or not; and a changing means of, when the maximum elapsed time is determined to be exceeding the maximum allowable elapsed time by the determination means, determining whether a collection interval of the resource information in the resource information providing apparatus can be shortened at least by the time obtained by subtracting the maximum allowable elapsed time from the maximum elapsed time or not, and, when the collection interval can be shortened, shortening the collection interval of the resource information; wherein when the resource information is acquired from other resource information providing apparatus and it is determined by the determination means that the collection interval of the resource information cannot be shortened, the changing means transmits a collection interval shortening request to the other resource information providing apparatus, the collection interval shortening request requesting to shorten the collection interval, at which the resource information is collected by the other resource information providing apparatus, by the time obtained by subtracting the maximum allowable elapsed time from the maximum elapsed time.

Effects of Invention

According to the present invention, in a resource information providing system in which resource information providing apparatuses are hierarchized in many levels, the freshness of resource information provided to a search request source can be adjusted so that the freshness required by the search request source is satisfied. In addition, the collection load can be reduced as much as possible within the range that satisfies the freshness required by the search request source.

BRIEF DESCRIPTION OF DRAWINGS

FIG. 2 is a diagram showing an example of collection schedule generation conditions;

FIG. 3 is a diagram showing an example of the collection schedule;

FIG. 4 is a diagram showing a configuration example of an information storage unit;

FIG. 12 is a diagram showing an example of a collection schedule generated by the collection schedule generating unit according to the first example;

FIG. 13 is a diagram showing another example of the collection schedule generated by the collection schedule generating unit according to the first example;

FIG. 21 is a diagram showing an example of a collection schedule of the case in which collection schedules are generated respectively for groups which are sorted by the types of resources of resource information.

EXPLANATION OF REFERENCE NUMERALS

1 . . . Search Client
2, 3 . . . Resource Information Providing Apparatus
4 . . . Management Target Apparatus
21, 31 . . . Search Processing Unit
22, 32 . . . Information Storage Unit
22, 33 . . . Information Collecting Unit
24, 34 . . . Control Unit
24a, 34a . . . Determination Unit
24b, 34b . . . Change Unit
25, 35 . . . Collection Schedule Generating Unit
26, 36 . . . Collection Schedule Storage Unit
27, 37 . . . Condition Storage Unit
41 . . . Information Providing Unit

BEST MODES FOR CARRYING OUT THE INVENTION

Embodiments of the present invention will be explained with reference to FIGS. 1 to 21.

First Embodiment

Figure 1:
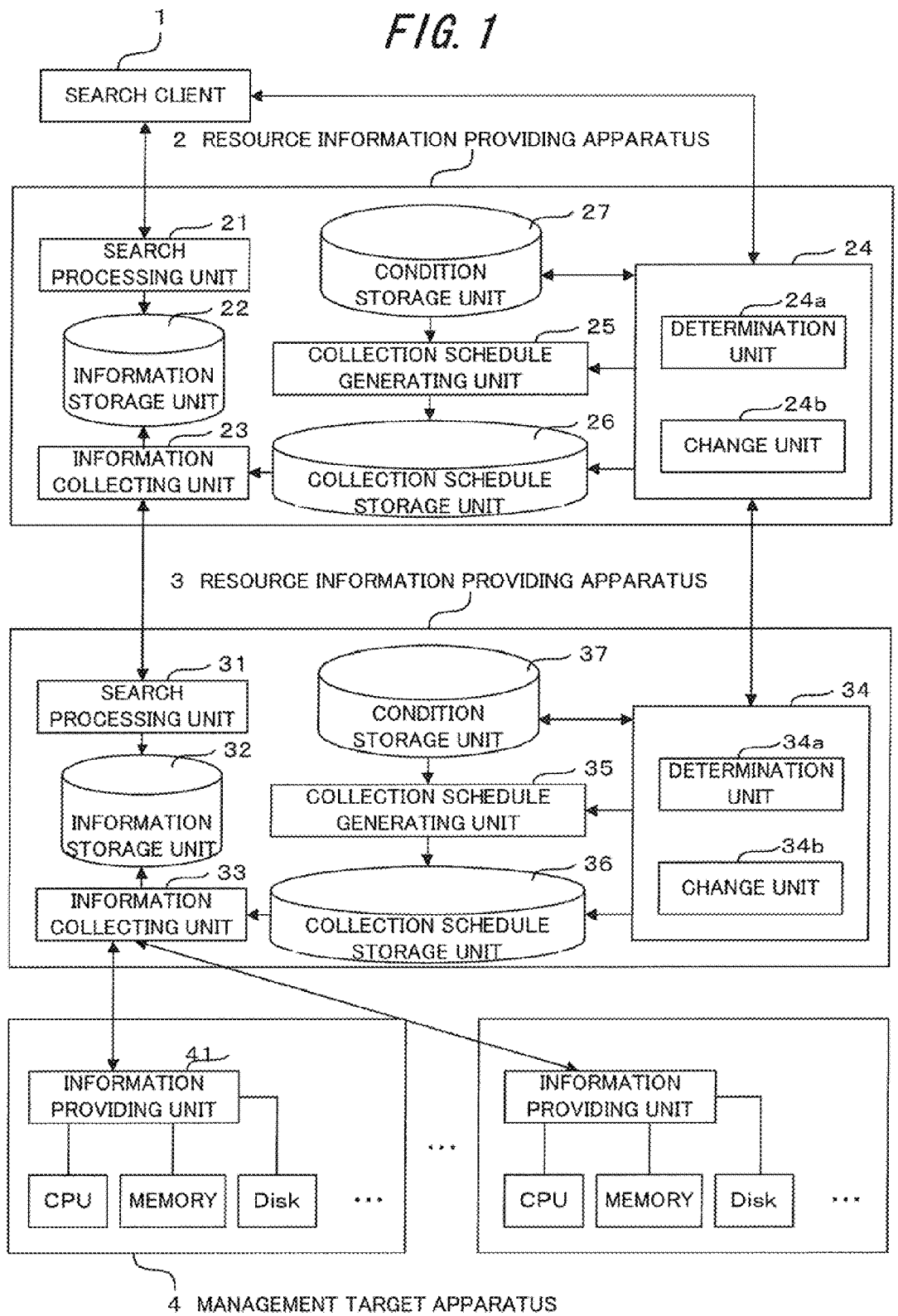
FIG. 1 is a block diagram of a resource information providing system according to a first embodiment of the present invention.

A resource information providing system according to a first embodiment of the present invention comprises, as blocks of the system shown in FIG. 1, a resource information providing apparatus 2, which is communicatably connected to a search client 1, and a resource information providing apparatus 3, which is communicatably connected to the resource information providing apparatus 2 and a plurality of management target apparatuses 4.

The resource information stored in the management target apparatuses 4 is provided to the search client 1 via the two hierarchized resource information providing apparatuses 2 and 3.

The management target apparatus 4 is an apparatus such as a computer, network device. The management target apparatus 4 has an information providing unit 41, which receives an information acquisition request from the resource information providing apparatus 3, acquires the resource information of its own apparatus, and transmits the information to the resource information providing apparatus 3. The resource information includes, for example, information about hardware such as the CPU utilization ratio, memory utilization volume, and disk access volume and information about software such as the configuration information and setting information of devices.

The resource information providing apparatus 3 has a search processing unit 31, an information storage unit (cache) 32, an information collecting unit 33, a control unit 34, a collection schedule generating unit 35, a collection schedule storage unit 36, and a condition storage unit 37.

The condition storage unit 37 stores collection schedule generation conditions by which the resource information providing apparatus 3 collects the pieces of resource information from the management target apparatuses 4. As an example is shown in FIG. 2, the collection schedule generation conditions include update interval 501 of the resource information, a concurrent update processing number MCU (Max Concurrent Updates) 502, and a polling time interval PI (Polling Interval) 503.

Herein, polling refers to inquiring each of objects whether there is a transmission (or processing) request or not when a plurality of communication devices or software are to cooperatively operate.

The update interval 501 of the resource information is the interval of collecting resource information r_i, wherein the resource information r_i ($1 \leq i \leq n$), which is a collection target, is associated with an identifier for uniquely identifying the resource information r_i ($1 \leq i \leq n$).

The concurrent update processing number 502 specifies an upper limit of the total number of pieces of resource information collected by one polling.

The polling time interval 503 is the time interval for activating an information collecting process by polling.

The collection schedule generating unit 35 generates the collection schedule, that satisfies the collection schedule generation conditions read from the condition storage unit 37.

The collection schedule storage unit 36 stores the collection schedule generated by the collection schedule generating unit 35. As an example is shown in FIG. 3, the collection schedule keeps update interval PC values (Interval PC (r_i)) and next PC values (Next PC (r_i)) corresponding to the identifiers of the resource information r_i.

In the case of the present embodiment, the number of activation of polling is the PC (Polling Count), and the information collecting unit 33 collects each piece of resource information r_i in any of the polling processes. At this point, the PC value of the point of a next update is defined by the next PC value (Next PC (r_i)), and the update interval in case that update is repeated, is defined by the update interval PC value (Interval PC (r_i)).

In accordance with the collection schedule stored in the collection schedule storage unit 36, the information collecting unit 33 transmits an information acquisition request to the management target apparatus 4 and receives resource information, which is transmitted from the management target apparatus 4 as a response therefor.

The information storage unit 32 stores the pieces of resource information collected by the information collecting unit 33. The information that, for example, the resource information belongs which management target apparatus 4 and is what kind of information may be stored for each piece of resource information in the condition storage unit 37 or may be managed by a different method. As shown in FIG. 4, the information storage unit 32 keeps latest values of the collected resource information r_i corresponding to the identifiers of the resource information r_i.

The search processing unit 31 searches the information storage unit 32 in accordance with a search request transmitted from the resource information providing apparatus 2 and transmits the corresponding resource information r_i to the resource information providing apparatus 2. The search request is provided in the form which specifies the identifier corresponding to the resource information r_i, which is the search target.

The control unit 34 has a determination unit 34a and a change unit 34b and changes the collection schedule by which the resource information providing apparatus 3 collects pieces of resource information from the management target apparatuses 4.

When an elapsed time specifying request specifying the maximum allowable elapsed time of certain resource information is transmitted from the resource information providing apparatus 2, the determination unit 34a determines whether the maximum elapsed time, which is taken after the resource information is acquired by the management target apparatus 4 and until the information reaches the search client 1 via the resource information providing apparatus 3, exceeds the above described maximum allowable elapsed time or not.

When the determination unit 34a determines that the maximum elapsed time exceeds the maximum allowable elapsed time, the change unit 34b determines whether the collection interval at which the resource information providing apparatus 3 collects the pieces of resource information can be shortened by at least the amount of excess or not and, if it can be shortened, shortens the collection interval of the resource information.

As shown in FIG. 1, the resource information providing apparatus 2 basically has a similar configuration as the resource information providing apparatus 3. The resource information providing apparatus 2 has a search processing unit 21, an information storage unit (cache) 22, an information collecting unit 23, a control unit 24, a collection schedule generating unit 25, a collection schedule storage unit 26, and a condition storage unit 27.

The condition storage unit 27 stores collection schedule generation conditions by which the resource information providing apparatus 2 collects the pieces of resource information of the management target apparatuses 4 from the resource information providing apparatus 3. The contents of the collection schedule generation conditions are same as those shown in FIG. 2.

The collection schedule generating unit 25 generates the collection schedule, which satisfies the collection schedule generation conditions read from the condition storage unit 27.

The collection schedule storage unit 26 stores the collection schedule generated by the collection schedule generating unit 25. The configuration of the generated collection schedule is same as that shown in FIG. 3.

In accordance with the collection schedule stored in the collection schedule storage unit 26, the information collecting unit 23 transmits a search request to the resource information providing apparatus 3 and receives resource information, which is transmitted from the resource information providing apparatus 3 as a response therefor.

The information storage unit 22 stores the resource information received by the information collecting unit 23. The information that, for example, the resource information belongs which management target apparatus 4 and is what kind of information may be stored for each resource information in the condition storage unit 27 or may be managed by a different method. As well as the case shown in FIG. 4, the information storage unit 22 keeps latest values of the collected resource information r_i corresponding to the identifiers of the resource information r_i.

The search processing unit 21 searches the resource information stored in the information storage unit 22 in accordance with a search request, which is transmitted from the search client 1 and specifying the identifier of the resource information r_i, and transmits the value of the corresponding resource information r_i to the search client 1.

The control unit 24 has a determination unit 24a and a change unit 24b and changes the collection schedule by which the resource information providing apparatus 2 collects resource information from the resource information providing apparatus 3.

When an elapsed time specifying request specifying the maximum allowable elapsed time of certain resource information is transmitted from the search client 1, the determination unit 24a determines whether the maximum elapsed time, which is taken after the resource information is acquired by the management target apparatus 4 and until the information reaches the search client 1 via the resource information providing apparatus 2, exceeds the above described maximum allowable elapsed time or not.

When the determination unit 24a determines that the maximum elapsed time exceeds the maximum allowable elapsed time, the change unit 24b determines whether the collection interval at which the resource information providing apparatus 2 collects the pieces of resource information can be shortened by at least the amount of excess or not and, if it can be shortened, shortens the collection interval of the resource information.

Meanwhile, if it cannot be shortened, the change unit 24b transmits an elapsed time specifying request to the resource information providing apparatus 3.

The search client 1 is a terminal device operated by a system operation manager or is a terminal device, which executes a management program.

When the system operation manager or the management program searches the resource information stored in the management target apparatus 4, a search request specifying the identifier of the resource information, which is the search target, is transmitted from the search client 1 to the resource information providing apparatus 2.

The search client 1 receives the resource information, which is the search target, and presents the information to the system operation manager through an output device or transmits the search result to the management program.

When the system operation manager or the management program sets the elapsed time which is taken after certain resource information is acquired by the management target apparatus 4 and until the information reaches the search client 1, the elapsed time specifying request specifying the maximum allowable elapsed time of the resource information is transmitted from the search client 1 to the resource information providing apparatus 2. The search client 1 receives the result that whether the request can be satisfied or not and presents the result to the system operation manager through the output device or transmits the request result to the management program.

Next, operation of the resource information providing system according to the present embodiment will be explained.

When the collection schedules are stored in the collection schedule storage units 26 and 36, the resource information providing apparatuses 2 and 3 collect the pieces of resource information. The collection schedules stored in the collection schedule storage units 26 and 36 may be automatically generated by the collection schedule generating units 25 and 35 in accordance with the conditions stored in the condition storage units 27 and 37 or may be created by a person.

First, the process of collecting the resource information from the management target apparatus 4 by the resource information providing apparatus 3 will be explained with reference to the flow chart of FIG. 5.

Figure 5:
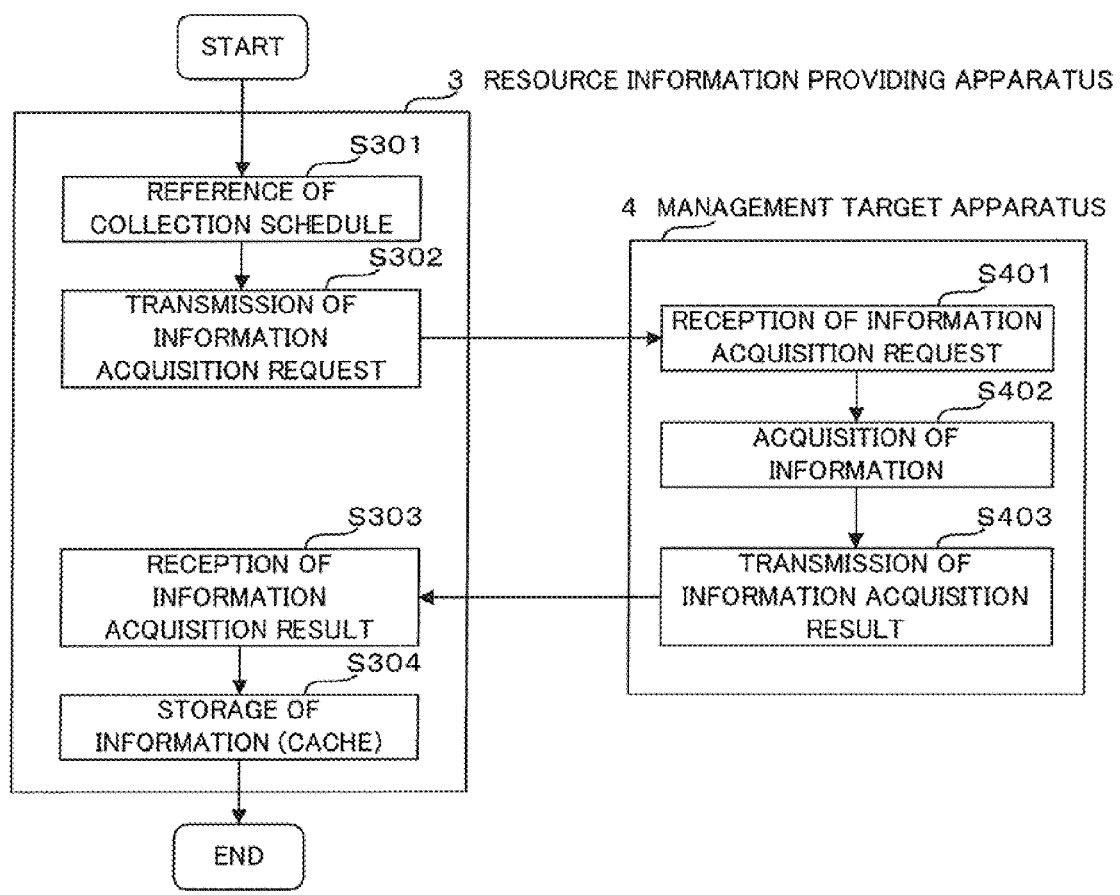
FIG. 5 is a flow chart showing a processing example in which a resource information providing apparatus collects resource information from a management target apparatus.

The information collecting unit 33 of the resource information providing apparatus 3 executes the information collecting process shown in the flow chart of FIG. 5 by the interval defined by the polling time interval.

First, the information collecting unit 33 constructs a list of the identifiers of the resource information, which is to be collected by the polling process of this time, based on the collection schedule stored in the collection schedule storage unit 36 (step S301).

Next, the information collecting unit 33 transmits information acquisition requests specifying the identifiers of the resource information, which is to be collected from the management target apparatuses 4, to the management target apparatuses 4 (step S302).

When the information providing unit 41 of the management target apparatus 4 receives the information acquisition request transmitted from the information collecting unit 33 (step S401), the unit acquires the resource information, which is required by the information acquisition request, from the apparatus 4 of its own (step S402) and transmits the information acquisition result to the resource information providing apparatus 3 (step S403).

When the information collecting unit 33 of the resource information providing apparatus 3 receives the information acquisition result transmitted from the management target apparatus 4 (step S303), the received information acquisition result is stored in the information storage unit 32 (step S304).

When the resource information of the identifier same as that of the pieces of resource information that are collected this time has already been stored in the information storage unit 32, the information collecting unit 33 updates the value of the resource information stored in the information storage unit 32 to the value of the resource information collected this time.

Next, the process of collecting the resource information from the resource information providing apparatus 3 by the resource information providing apparatus 2 will be explained.

Figure 6:
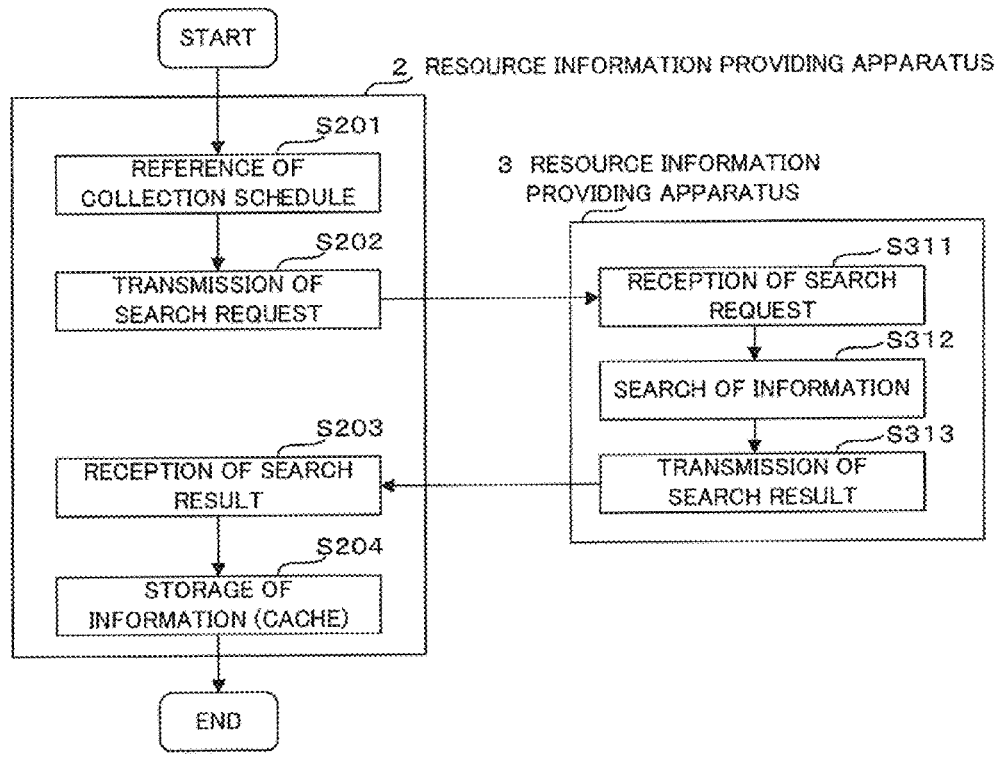
FIG. 6 is a flow chart showing a processing example in which a resource information providing apparatus in an upper level of hierarchy collects resource information from the management target apparatus in a lower level of hierarchy.

The information collecting unit 23 of the resource information providing apparatus 2 executes the information collecting process shown in the flow chart of FIG. 6 at the interval defined by the polling time interval.

First, the information collecting unit 23 constructs a list of the identifiers of the resource information, which is to be collected by the polling process of this time, based on the collection schedule stored in the collection schedule storage unit 26 (step S201).

Next, the information collecting unit 23 transmits a search request specifying the resource information, which is to be collected from the resource information providing apparatus 3, by identifiers to the resource information providing apparatus 3 (step S202).

When the search processing unit 31 of the resource information providing apparatus 3 receives the search request transmitted from the information collecting unit 23 (step S311), the search processing unit 31 searches the resource information, which is specified by the identifiers, from the information storage unit 32 (step S312) and transmits the search result to the resource information providing apparatus 2 (step S313).

When the information collecting unit 23 of the resource information providing apparatus 2 receives the search result transmitted from the information storage unit 32 (step S203), the received search result is stored in the information storage unit 22 (step S204).

When the resource information of the identifier same as that of the resource information collected from the resource information providing apparatus 3 this time has already been stored in the information storage unit 22, the information collecting unit 23 updates the value of the resource information, which is stored in the information storage unit 22, to the value of the resource information collected this time.

Next, the process of collecting the resource information from the resource information providing apparatus 2 by the search client 1 will be explained.

Figure 7:
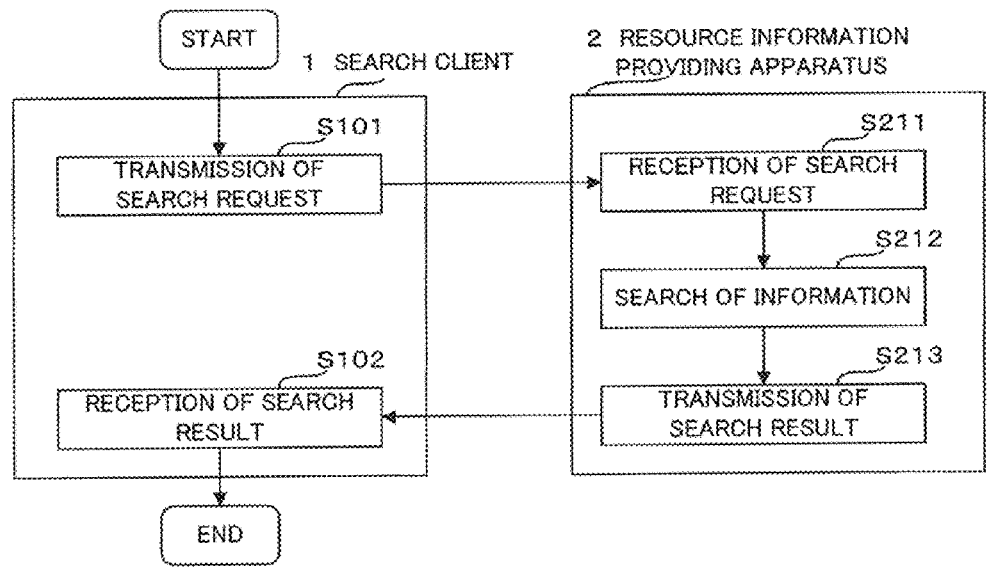
FIG. 7 is a flow chart showing a processing example in which a search client collects resource information from the resource information providing apparatus.

The search client 1 transmits the search request, which includes a search expression input by the system operation manager or the management program, to the resource information providing apparatus 2 (step S101 in FIG. 7).

When the search processing unit 21 of the resource information providing apparatus 2 receives the search request transmitted from the search client 1 (step S211), the unit searches the resource information that satisfies the search expression from the resource information stored in the information storage unit 22 (step S212) and transmits the search result to the search client 1 (step S213).

The search client 1 receives the search result transmitted from the information processing unit 21 and outputs the search result to the output device (step S102).

Figure 8:
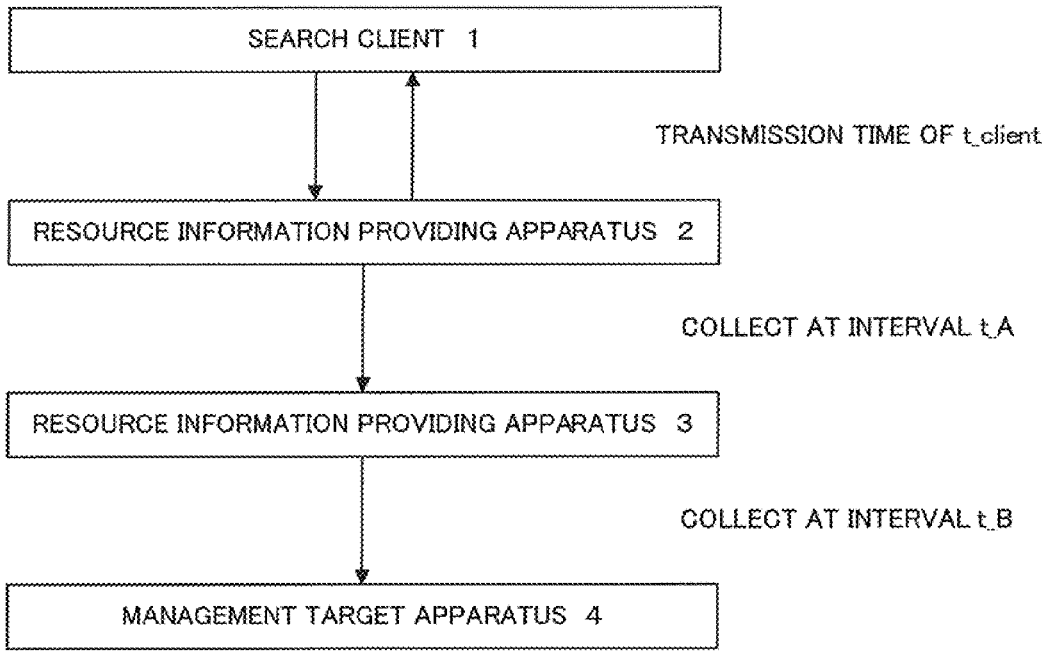
FIG. 8 is a diagram for explaining maximum elapsed time from acquisition of the resource information by the management target apparatus until arrival of the resource information to the search client.
Figure 9:
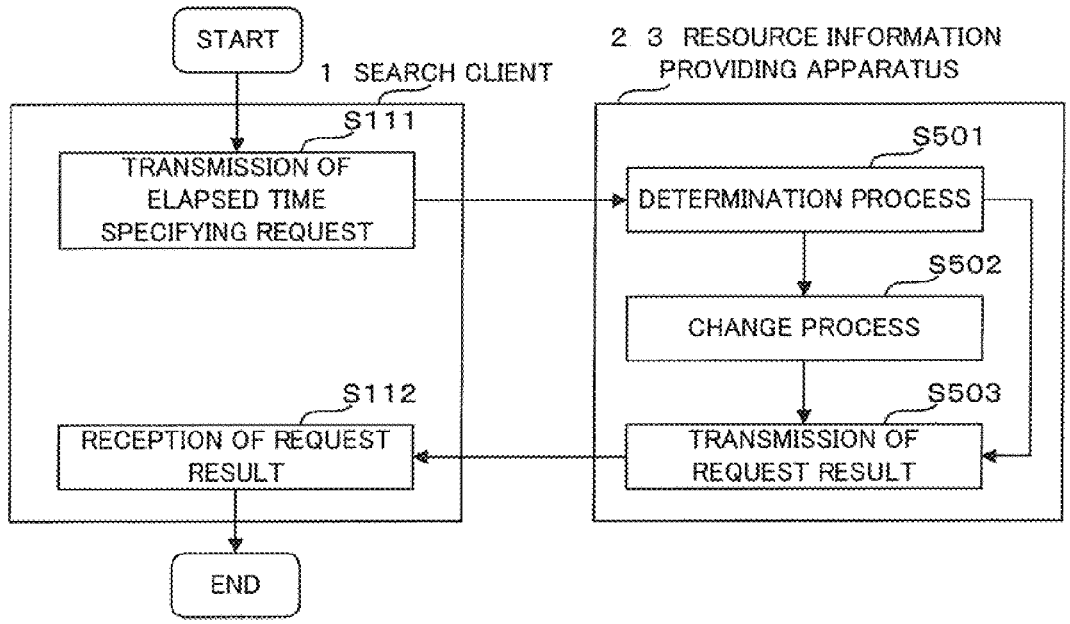
FIG. 9 is a flow chart showing a processing example in which an elapsed time specifying request is transmitted from the search client to the resource information providing apparatus.

The maximum elapsed time t_max which is taken after certain resource information X is acquired by the management target apparatus 4 until the information reaches the search client 1 can be approximated by the below expression as shown in FIG. 8 where the interval at which the resource information X is collected from the management target apparatus 4 by the resource information providing apparatus 3 is t_B, the interval at which the resource information X is collected from the resource information providing apparatus 3 by the management information providing apparatus 2 is t_A, and the time required to transfer the search result to the search client 1 by the resource information providing apparatus 2 is t_client.

$$\text{Maximum elapsed time } t\_max = t\_client + t\_A + t\_B \quad (1\text{-}1)$$

Next, operation of the resource information providing system according to the present embodiment in case that a time specifying request specifying maximum allowable elapsed time t_req with respect to the resource information X is transmitted from the search client 1 to the resource information providing apparatus 2 will be explained.

When the elapsed time specifying request is transmitted from the search client 1 to the resource information providing apparatus 2 (step S111 in FIG. 9), the control unit 24 of the resource information providing apparatus 2 receives the elapsed time specifying request, transmitted from the search client 1, and executes the below process in cooperation with the control unit 34 of the resource information providing apparatus 3.

First, based on the above described expression (1-1), the maximum elapsed time t_max, which is taken after the resource information X is acquired by the management target apparatus 4 until the information reaches the search client 1, is calculated, and whether the maximum elapsed time t_max is exceeding the maximum allowable elapsed time t_req or not is determined (step S501).

When the maximum elapsed time t_max is exceeding the maximum allowable elapsed time t_req, the control unit 24 of the resource information providing apparatus 2 selects either one resource information providing apparatus, which is capable of shortening the collection interval of collecting the resource information X by at least the exceeding time (t_max−t_req), from the resource information providing apparatuses 2 and 3 and executes a change process of shortening the collection interval of the resource information X of the selected resource information providing apparatus (step S502). Then, the control unit 24 transmits a request result, which is stating that the elapsed time specifying request is satisfied, to the search client 1 (step S503).

When the maximum elapsed time t_max is not exceeding t_req, the control unit 24 skips the change process S502 and transmits the request result, which is stating that the elapsed time specifying request is satisfied, to the search client 1 (step S503).

Meanwhile, when both the resource information providing apparatuses 2 and 3 cannot shorten the collection interval of the resource information X by at least (t_max−t_req), the control unit 24 transmits a request result, which is stating that the elapsed time specifying request is not satisfied, to the search client 1 (step S503). The search client 1 receives the request result and notifies that to the management program, etc. (step S112).

Figure 10:
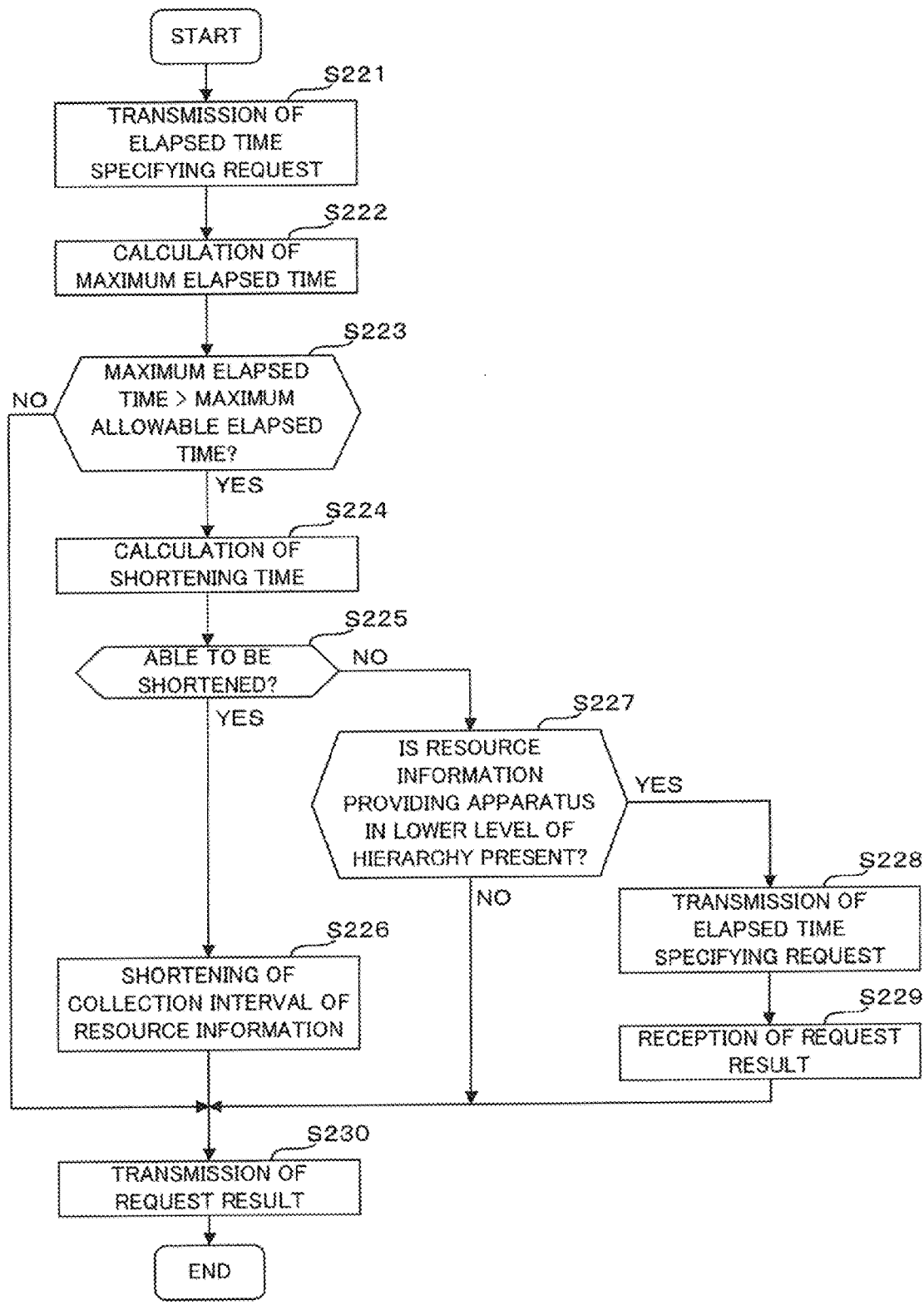
FIG. 10 is a flow chart showing a processing example of the resource information providing apparatus when the elapsed time specifying request is received.

When the resource information providing apparatus 2 and the resource information providing apparatus 3 receive the elapsed time specifying request, the resource information providing apparatus 2 and the resource information providing apparatus 3 execute the process shown by the flow chart of FIG. 10.

When the determination unit 24*a* of the resource information providing apparatus 2 receives the elapsed time specifying request from the search client 1 (step S221), the determination unit calculates the maximum elapsed time t_max of the resource information X based on the above described expression (1-1) (step S222). Above described t_client of the expression (1-1) can be, for example, set as a fixed value in advance. The collection interval t_A of the resource information providing apparatus 2 can be obtained by referencing the update interval 501 of the resource information X stored in the condition storage unit 27 or the IntervalPC value of the resource information X stored in the collection schedule storage unit 26.

Meanwhile, the determination unit 24*a* can acquire the collection interval t_B of the resource information X of the resource information providing apparatus 3 by any of below methods.

1) Method 1

Each of the resource information providing apparatuses present on the transmission path of the resource information X is inquired about the collection interval of the resource information X of the apparatus.

2) Method 2

A database retaining the collection intervals of the resource information of the other resource information providing apparatus is provided in each of the resource information providing apparatuses, and the interval is acquired from this database.

3) Method 3

A database retaining collection intervals of resource information of the resource information providing apparatuses is provided commonly for the plurality of resource information providing apparatuses, and the interval is acquired from the database.

Next, the determination unit 24*a* compares the maximum elapsed time t_max of the resource information X with the maximum allowable elapsed time t_req (step S223). When the maximum elapsed time t_max is not exceeding the maximum allowable elapsed time t_req, the control unit 24 transmits the request result, which is stating that the request is satisfied, to the search client 1 (step S230) and finishes the process. When the maximum elapsed time t_max is exceeding the maximum allowable elapsed time t_req, the process is succeeded by the change unit 24*b*.

The change unit 24*b* calculates a shortening time t_cut of the collection interval of the resource information X, which is necessary for reducing the maximum elapsed time t_max to the maximum allowable elapsed time t_req or less, by the below expression.

$$\text{Shortening time } t\_cut = t\_max - t\_req \tag{1-2}$$

Next, based on physical conditions and restriction conditions, which are given in advance, the change unit 24*b* determines whether the collection interval t_A at which the resource information X is collected by the information providing apparatus 2 can be shortened by t_cut or not (step S225).

For example, in the case of t_A≦t_cut, the change unit 24*b* determines that t_A cannot be physically shortened.

On the other hand, in the case of t_A>t_cut, since t_A can be physically shortened, whether it can be shortened or not is determined based on the restriction conditions. For example, when a minimum collection interval t_min is provided as the restriction condition, the restriction condition is not satisfied in the case of (t_A−t_cut)<t_min; therefore, the change unit 24*b* determines that t_A cannot be shortened. In addition, there is a restriction on the upper limit of the maximum number of pieces of collection resource information per one polling process. Therefore, when the restriction is not satisfied if the collection interval of collecting the resource information X by the information providing apparatus 2 is changed to (t_A−t_cut), the change unit 24*b* determines that t_A cannot be shortened.

Whether the restriction of the maximum number of pieces of collection resource information per one polling process cannot be satisfied or not after the collection interval of collecting the resource information X by the information providing apparatus 2 is changed to (t_A−t_cut) may be checked by changing merely the collection schedule of the resource information X, or, other than this, it can be checked by generating a collection schedule including that of other resource information again.

Next, when the collection interval t_A can be shortened by t_cut, the change unit 24*b* changes the collection interval t_A to (t_A−t_cut) (step S226). Specifically, it is changed by any of the below methods.

1) Method 1

The change unit 24*b* changes the IntervalPC value of the resource information X stored in the collection schedule storage unit 26. In this process, at the same time, the update interval of the resource information X stored in the condition storage unit 27 is changed as well.

2) Method 2

After the update interval of the resource information X stored in the condition storage unit 27 is changed, the collection schedule generating unit 25 generates the collection schedule of the resource information again under the conditions stored in the condition storage unit 27 and updates the current collection schedule stored in the collection schedule storage unit 26 to the collection schedule, which has been generated again.

Next, the change unit 24b transmits the request result, which is stating that the elapsed time specifying request is satisfied, to the search client 1 (step S230) and finishes the process.

On the other hand, when the collection interval t_A cannot be shortened by t_cut, the change unit 24b determines whether the resource information X is collected from other resource information providing apparatus or not, in other words, whether the resource information providing apparatus in a lower level of hierarchy is present or not (step S227). If the resource information providing apparatus of the lower level of the hierarchy is not present, the control unit 24 transmits the request result, which is stating that the elapsed time specifying request is not satisfied, to the search client 1 and finishes the process.

In the case of the present embodiment, the resource information providing apparatus 3 is present in the lower level of hierarchy of the resource information providing apparatus 2. Therefore, the change unit 24b transmits the elapsed time specifying request, which is received from the search client 1, to the resource information providing apparatus 3 (step S228). In this process, the change unit 24b may attach the maximum elapsed time t_max calculated in step S222 and the shortening time t_cut calculated in step S224 to the elapsed time specifying request. The change unit 24b waits for transmission of a request result, which is for the elapsed time specifying request, by the resource information providing apparatus 3. When the resource information providing apparatus 3 transmits the request result for the elapsed time specifying request, the change unit 24 receives the request result (step S229) and transfers the request result to the search client 1 (step S230).

Next, also with reference to FIG. 10, the process carried out by the resource information providing apparatus 3, which has received the elapsed time specifying request, after the elapsed time specifying request is transmitted to the resource information providing apparatus 3 by the resource information providing apparatus 2 will be explained.

When the determination unit 34a of the resource information providing apparatus 3 receives the elapsed time specifying request transmitted from the search client 1 (step S221), the determination unit calculates the maximum elapsed time t_max of the resource information X based on the above described expression (1-1) (step S222). However, when the maximum elapsed time t_max is attached to the elapsed time specifying request, the calculation in step S222 is omitted. Next, the determination unit 34a confirms that the maximum elapsed time t_max of the resource information X is exceeding the maximum allowable elapsed time t_req (step S223), and the process is succeeded by the change unit 34b.

The change unit 34b calculates the shortening time t_cut, which is necessary for shortening the maximum elapsed time to the maximum allowable elapsed time t_req or less, based the above described expression (1-2). However, when the shortening time t_cut is attached to the elapsed time specifying request, this calculation is omitted.

Next, the change unit 34b determines whether the collection interval t_B of collecting the resource information X can be shortened by t_cut in the resource information providing apparatus 3 or not (step S225). When the collection interval t_B can be shortened by t_cut in the resource information providing apparatus 3, the change unit 34b changes the collection interval t_B to (t_B−t_cut) (step S226). After the change, the change unit 34b transmits the request result, which is stating that the elapsed time specifying request is satisfied, to the resource information providing apparatus 2 (step S230) and finishes the process.

On the other hand, when the collection interval t_B cannot be shortened by t_cut in the resource information providing apparatus 3, the change unit 34b determines whether the resource information X is collected from another resource information providing apparatus or not, in other words, whether a resource information providing apparatus is present or not in a lower level of hierarchy of the resource information providing apparatus 3 (step S227).

In the case of the present embodiment, the resource information providing apparatus is not present in the lower level of hierarchy of the resource information providing apparatus 3; therefore, the control unit 34 transmits the request result, which is stating that the elapsed time specifying request is not satisfied, to the resource information providing apparatus 2 (step S230) and finishes the process.

Subsequently, by using a simple example, a change operation of the collection interval of the resource information in the present embodiment will be explained.

For example, it is assumed that t_A is 40 seconds, t_B is 30 seconds, and t_client is 5 seconds with respect to the resource information X. Herein, it is assumed that an elapsed time specifying request specifying t_req is input via the search client 1 since the operation manager of the search client 1 desires to reference the resource information X by the elapsed time of t_req=60 seconds or less.

The elapsed time specifying request including the value of t_req required by the operation manager of the search client 1 is transmitted to the resource information providing apparatus 2 via the search client 1 and received by the determination unit 24a of the control unit 24 (step S221). The determination unit 24a calculates t_max=t_client+t_A+t_B=75 (step S222). When it is compared with t_req=60, t_max is larger than t_req; therefore, the determination unit 24a passes the process on to the change unit 24b (step S223). The change unit 24b calculates the shortening time t_cut=75−60=15 which is necessary for satisfying the request (steps S223, S224). The change unit 24b determines whether the collection interval t_A=40 can be shortened to 25 seconds (40−15=25 seconds) or not in the resource information providing apparatus 2 (step S225).

For example, when the resource information providing apparatus 2 does not have any restriction about collection load and when the collection interval of the resource information X can be shortened to 25 seconds, the change unit 24b changes the collection interval t_A of collecting the resource information X from 40 seconds to 25 seconds (step S226). Consequently, the maximum elapsed time t_max of the resource information X becomes 60 seconds, and the request of the operation manager is satisfied.

On the other hand, when the resource information providing apparatus 2 has, for example, a restriction that the collection interval t_A cannot be set to 30 seconds or less and when the current largest concurrent update processing number of the collection schedule stored in the collection schedule storage unit 26 is equal to the concurrent update processing number 502, it is assumed that the change unit 24b changes the collection interval t_A from 40 seconds to 25 seconds. In this case, if the change unit 24b cannot shorten the collection interval t_A to 25 seconds for the reason that the largest concurrent update processing number after the change exceeds the concurrent update processing number 502, the control unit 24 transfers the elapsed time specifying request to the resource information providing apparatus 3 (step S228).

The determination unit 34a of the resource information providing apparatus 3 determines that the maximum elapsed time t_max=75 of the resource information X is exceeding t_req=60 of the elapsed time specifying request, and passes the process on to the change unit 34b. The change unit 34b determines whether t_B can be shortened by the shortening time t_cut=75−60=15 seconds or not in the resource information providing apparatus 3 (step S225).

When the change unit 34b is capable of shortening t_B, the change unit 34b changes the collection interval t_B to 30−15=15 seconds. After the change, the request result, which is stating that the elapsed time specifying request is satisfied, is notified to the search client 1 via the resource information providing apparatus 2.

On the other hand, when the change unit 34b is not capable of shortening t_B, the request result, which is stating that the elapsed time specifying request is not satisfied, is notified to the search client 1 via the resource information providing apparatus 2.

Next, an example in which the collection schedule generating units 25 and 35 generate collection schedules will be explained in detail. Note that, since the collection schedule generating units 25 and 35 can have the same configuration, a process executed by the collection schedule generating unit 25 will be explained below.

FIRST EXAMPLE

Figure 11:
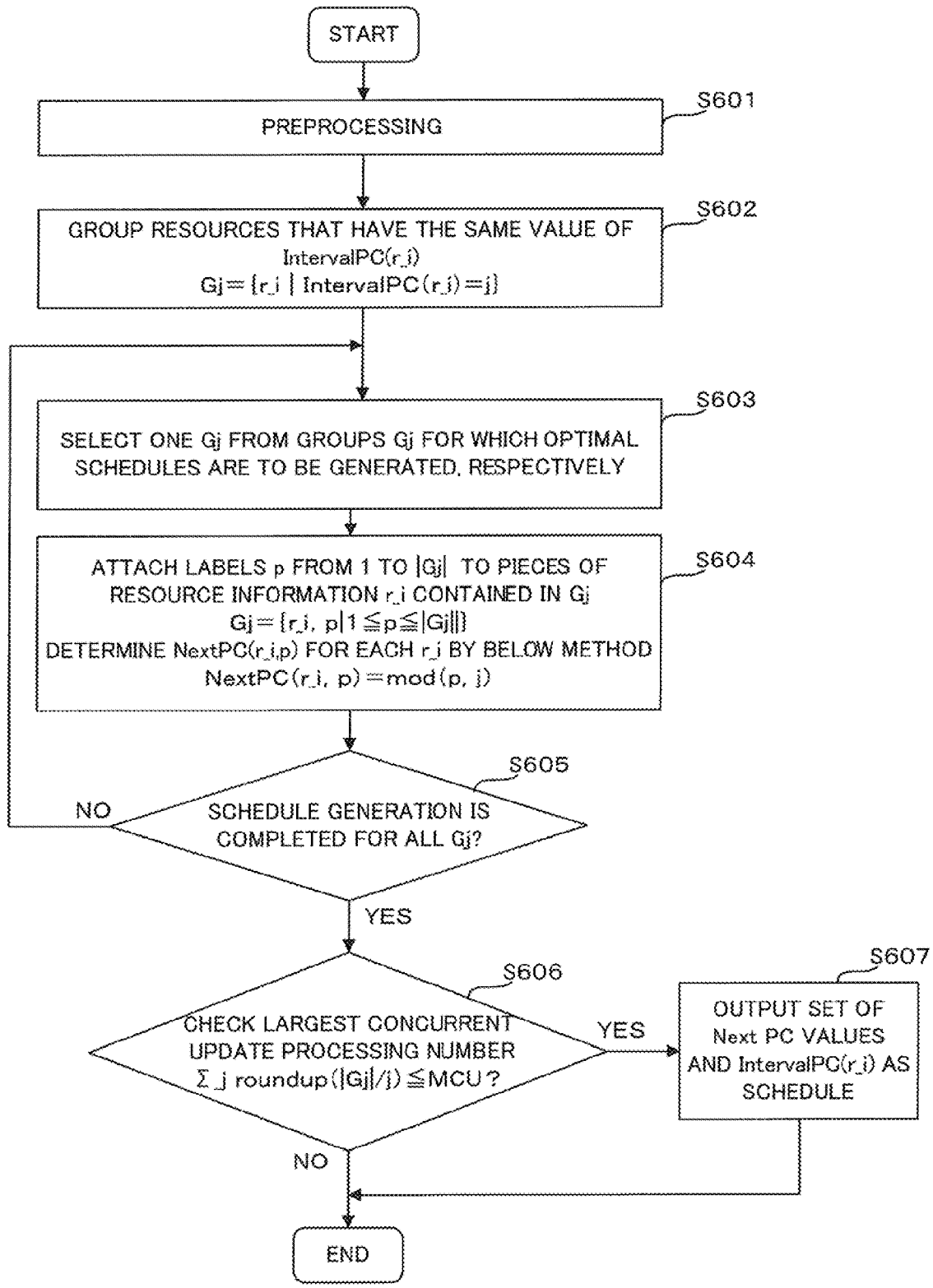
FIG. 11 is a flow chart showing a processing example of a collection schedule generating unit according to a first example.

An example of a flow chart of the process executed by the collection schedule generating unit 25 according to the present example is shown in FIG. 11. As a presupposition of the process, it is assumed that the update interval 501 of the resource information r_i serving as a collection target, the concurrent update processing number MCU 502, and the polling time interval PI 503 as shown in FIG. 2 are stored in the condition storage unit 27. The collection schedule generating unit 25 generates an optimal collection schedule which satisfies the update intervals with respect to the resource information and ensures suppressing collection load to a certain level or less. In other words, the collection schedule generating unit 25 generates the collection schedule (set of NextPC(r_i) and IntervalPC(r_i)) which causes the largest value of the concurrent update processing number to be small as much as possible. Herein, the value of NextPC(r_i) is updated by adding IntervalPC(r_i) every time an information collecting process is carried out (NextPC(r_i)=NextPC(r_i)+IntervalPC(r_i)). The generality of NextPC(r_i) is not lost even in the case of $1 \leq NextPC(r\_i) \leq IntervalPC(r\_i)$.

[Preprocessing]

First, the collection schedule generating unit 25 carries out preprocessing (step S601). In the preprocessing, the collection schedule generation unit 25 obtains IntervalPC(r_i) and the least common multiple LCMI (Least Common Multiple Interval) of IntervalPC(r_i) set for the resource information r_i.

IntervalPC(r_i) is set as the update interval 501 of the resource information r_i. Herein, the method of the present example is effective when r_i can be grouped by the values of IntervalPC(r_i). Therefore, when an environment which easily enables grouping is prepared, the range of application can be expanded. For example, profiles specifying usable update intervals in advance are prepared, and each one of all the management target apparatuses uses any of the profiles according to the update intervals. Since the same IntervalPC(r_i) is set for the management target apparatuses using the same profile, the management target apparatuses are grouped in the units of the profiles. In this process, when the values of IntervalPC(r_i) determined by the update intervals of the profiles are prepared to be relatively prime or prime numbers, the collection schedule generating unit 25 can generate an optimal schedule (the reason therefor will be described later).

The least common multiple LCMI (Least Common Multiple Interval) is obtained by the below expression.

$$LCMI = lcm(Interval(r\_i)) \quad (2)$$

wherein, lcm is a function for obtaining the least common multiple.

Since information collecting processes are repeated at the intervals of IntervalPC(r_i), all the patterns of resource information collection are repetition of the patterns of the range from PC=1 to PC=LCMI. Therefore, NextPC(r_i) has to be determined so that the largest concurrent update processing number is equal to or less than the concurrent update processing number MCU in the range.

Next, the collection schedule generating unit 25 groups the resource information that has the same value of IntervalPC(r_i) (step S602). The group grouped by IntervalPC(r_i)=j is Gj.

$$Gj = \{r\_i | IntervalPC(r\_i) = j\} \quad (3)$$

Next, the collection schedule generating unit 25 generates optimal schedules for the groups Gj, respectively (steps S603 to S605). First, one group for which an optimal schedule is to be generated is selected (step S603). Next, labels p having serial numbers from 1 to |Gj| are attached to the resource information r_i contained in Gj.

$$Gj = \{r\_i, p | 1 \leq p \leq |Gj|\} \quad (4)$$

Then, NextPC(r_i, p) is determined for each r_i by the below method (step S604).

$$NextPC(r\_i, p) = mod(p, j) \quad (5)$$

wherein, mod is a remainder function.

In this process, the largest concurrent update processing number of the group of Gj is roundup(|Gj|/j). Herein, roundup is a function of rounding up the part after the decimal point.

When generation of the schedules of all Gj is completed (step S605: YES), the collection schedule generating unit 25 generates a final information collection schedule by combining the optimal schedules which are generated for the groups, respectively. Then, the collection schedule generating unit 25 calculates the largest concurrent update processing number of the generated information collection schedule and determines whether it is equal to or less than the concurrent update processing number MCU or not (step S606).

$$\Sigma\_j \, roundup(|Gj|/j) \leq MCU? \quad (6)$$

When the largest concurrent update processing number is equal to or less than the concurrent update processing number MCU, the collection schedule generating unit 25 outputs the generated information collection schedule, in other words, the set of NextPC(r_i) and IntervalPC(r_i) of the resource information to the collection schedule storage unit 26 and finishes the process (step S607).

When the largest concurrent update processing number is not equal to or less than the concurrent update processing number MCU, the collection schedule generating unit 25 determines that the information collection schedule cannot be generated and finishes the process.

Next, effects of the collection schedule generating unit 25 according to the present example will be explained.

In the method of the present example, the pieces of resource information that haves the same value of IntervalPC(r_i) are sorted to the same group Gj, and a collection schedule is generated for each group Gj. Therefore, compared with the method in which the concurrent update processing number is calculated and subjected to determination with respect to all conceivable set patterns of NextPC(r_i) without carrying out grouping (generally referred to as a full search method), the calculation time for schedule generation can be significantly reduced in the method of the present example. Hereinafter, the full search method will be explained, and the effects of the method of the present example will be explained.

(Full Search Method)

Figure 20:
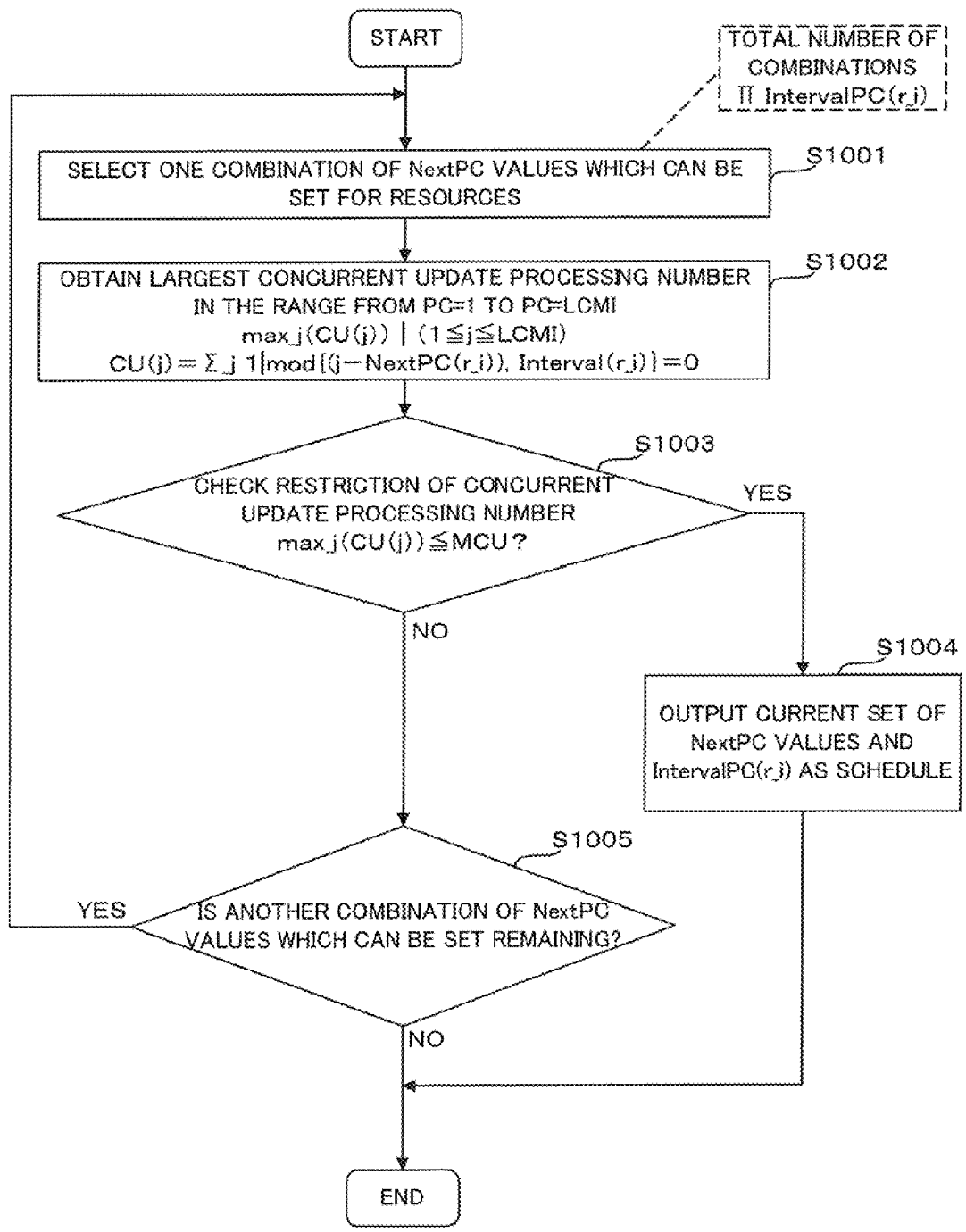
FIG. 20 is a flow chart showing a generation procedure of a collection schedule by a full search method.

A flow chart showing a generation procedure of a collection schedule according to the full search method is shown in FIG. 20. It is presupposed that IntervalPC(r_i) and the least common multiple LCMI thereof have already been obtained for the resource information r_i.

First, the collection schedule generating unit 25 selects one from the combinations of NextPC(r_i) which can be set (step S1001). The total number of the combinations is ΠIntervalPC(r_i), in other words, the product of all the IntervalPC values.

Next, as shown by the below expression, the number of update processes is counted with respect to each PC value, and the value at which the concurrent update processing number is the largest is extracted, thereby obtaining the largest concurrent update processing number in the range from PC=1 to PC=LCMI (step S1002).

$$\max\_j(CU(j))|(1 \leq j \leq LCMI)\ CU(j) = \Sigma\_j\ 1|\mod\{(j-\text{NextPC}(r\_i)), \text{Interval}(r\_i)\} = 0 \quad (7)$$

Subsequently, whether the largest concurrent update processing number satisfies the restriction of the concurrent update processing number MCU or not is checked (step S1003).

$$\max\_j(CU(j)) \leq MCU? \quad (8)$$

When the largest concurrent update processing number is equal to or less than the concurrent update processing number MCU, the current set of the NextPC values and IntervalPC(r_i) is output as a collection schedule, and the process is finished (step S1004).

When the largest concurrent update processing number is not equal to or less than the concurrent update processing number MCU, the collection schedule generating unit 25 checks whether there is another combination of NextPC(r_i) which can be set (step S1005), and, if there is the combination of NextPC(r_i), returns to step S1001 to repeat the process. If there is not the combination of NextPC(r_i), the collection schedule generating unit 25 determines that the schedule cannot be generated and finishes the process.

As described above, in the full search method, when the collection schedule generating unit 25 finally determines that the schedule that satisfies the restriction of the concurrent update processing number MCU is not present, all the combinations of ΠIntervalPC(r_i) have to be examined, and the calculation time is increased by exponential time with respect to the number i of pieces of resource information.

On the other hand, in the method of the present example, by grouping the resource information that has the same value of IntervalPC(r_i), the combinations of NextPC(r_i) can be determined approximately by the linear order of the number i of pieces of resource information.

The full search method and the method of the present example will be compared with each other by using below specific examples.

First, an example of the case in which the number of the management target apparatuses is small will be shown. Then, an example of the case in which the number of pieces of resource information is increased will be shown.

As the example of the case in which the number of the management target apparatuses is small, the case in which resource information has the update interval PC values of 3, 5, and 7, wherein the information of each value includes three pieces of information, is considered. In this case, the method of setting the next update PC values for the resource information includes $3^3 * 5^3 * 7^3 = 1157625$ ways. When those having the same update interval PC values are considered to be the same, the redundant numbers are eliminated, and the total number of the combinations becomes 29400 ways ($_3H_3 *_5H_3 *_7H_3$, wherein redundant combinations are used). In accordance with the combination method, the largest concurrent update processing number may be varied between 3 to 9. Therefore, in order to check whether the restriction of the required concurrent update processing number can be satisfied or not, the 29400 combinations have to be examined one by one.

On the other hand, in the method of the present example, the information collection schedule shown in FIG. 12 is generated, wherein the concurrent processing number is 3, which is a smallest value.

Next, the case in which the number of resources is increased, and the resource information has the update interval PC values of 3, 5, 7, 11, 17, wherein the information of each value includes 20 pieces of information, is considered. In this case, the method of setting the next update PC values for the resources includes $1.24 \times 10^{29}$ ways or more even when redundancy is taken into consideration ($_3H_{20} *_5H_{20} *_7H_{20} *_{11}H_{20} *_{17}H_{20}$, wherein redundant combinations are used). In accordance with the combinations, the concurrent update processing number may be varied between 18 to 100. Examining the cases of $1.24 \times 10^{29}$ ways or more one by one to check whether the restriction of the required concurrent update processing number is satisfied or not is not practical in terms of calculation time and calculation resources.

On the other hand, in the method of the present example, the calculation is completed in the number of steps of the integral multiple order of the total resource number 100, and an optimal schedule of the largest concurrent update processing number 18 can be generated.

In the above described examples, since there are not many types of the update interval PC values, the number of combinations is reduced because of redundancy. In the case in which the types of the update interval PC values are increased, the total number of combinations is increased more. Therefore, it is difficult to apply the full search method to a system having management targets having a scale of thousands of units.

In addition, according to the present example, when the update interval PC values j of the groups are relatively prime, an optimal schedule can be generated. When the update interval PC values j of the groups are relatively prime, regardless of the values of NextPC(r_i), redundancy of update processes (update processes are required at the same PC value) is exhaustively generated when any two groups thereof are combined. The total sum of the largest concurrent update processing number of each group is the minimum largest concurrent update processing number, and the concurrent update processing number cannot be reduced more than that.

Furthermore, in the method disclosed in Patent Literature 2 of setting a concurrent update number for each type of management target apparatuses and generating a collection schedule for each type of the management target apparatuses, when the same concurrent update number is set for the resource information of a plurality of different types, a plurality of collection schedules of the same concurrent update number are independently generated. Therefore, there is an inclination that many gaps are generated in the collection schedules.

On the other hand, in the method of the present example, the resource information having the same concurrent update number is put into one group to generate a collection schedule. Therefore, the gaps of the collection schedule can be reduced, and a more optimal information collection schedule can be generated.

Figure 21:
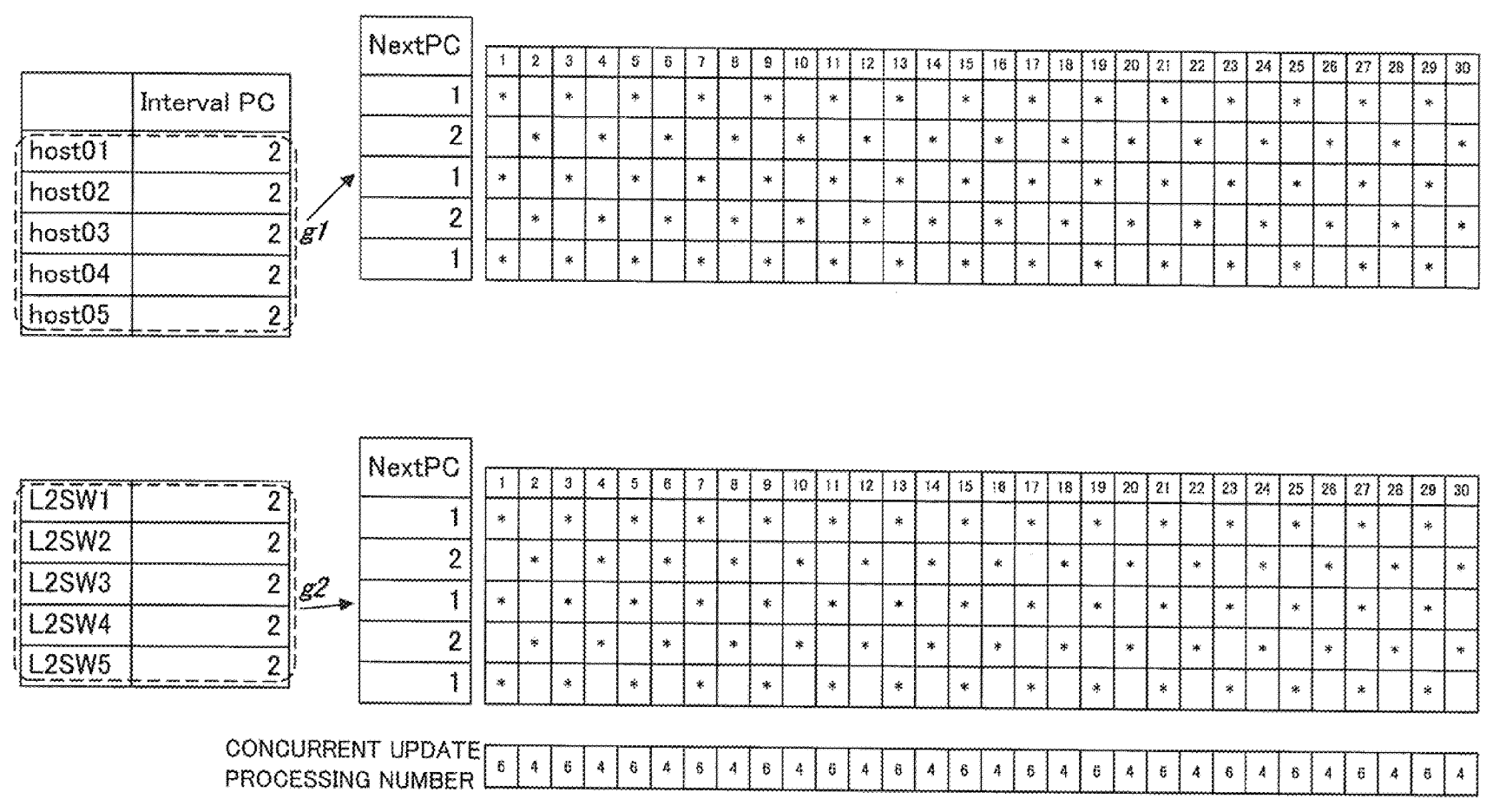

For example, as shown in FIG. 21, it is assumed that there are ten pieces of resource information having the update interval PC value of 2, wherein the pieces of information are sorted into two resource groups g1 and g2 when sorted by the type of the management target apparatuses. In the method described in Patent Literature 2, since an information collection schedule is independently generated for each group, the two collection schedules shown in FIG. 21 are generated. According to the generated collection schedules, the concurrent update number of the NextPC values is 6 at most as shown in a lower part of FIG. 21.

Figure 13:
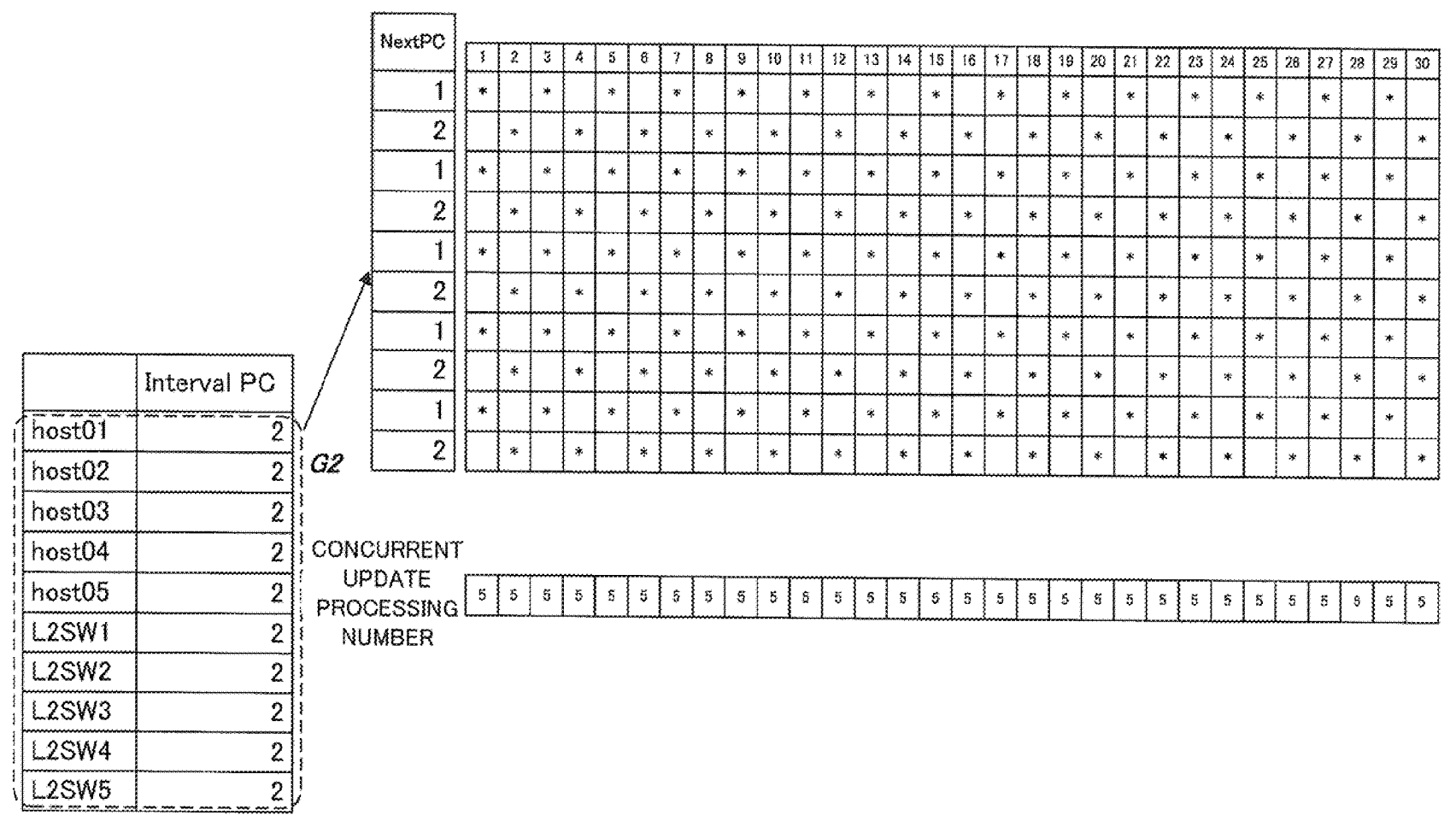

On the other hand, in the method of the present example, as shown in FIG. 13, the ten pieces of resource information are sorted into one group G2, and a collection schedule is generated collectively. As a result, as shown in FIG. 13, one collection schedule is generated, and the concurrent update number of the NextPC values is within 5 at most as shown in a lower part of FIG. 13.

SECOND EXAMPLE

Figure 14:
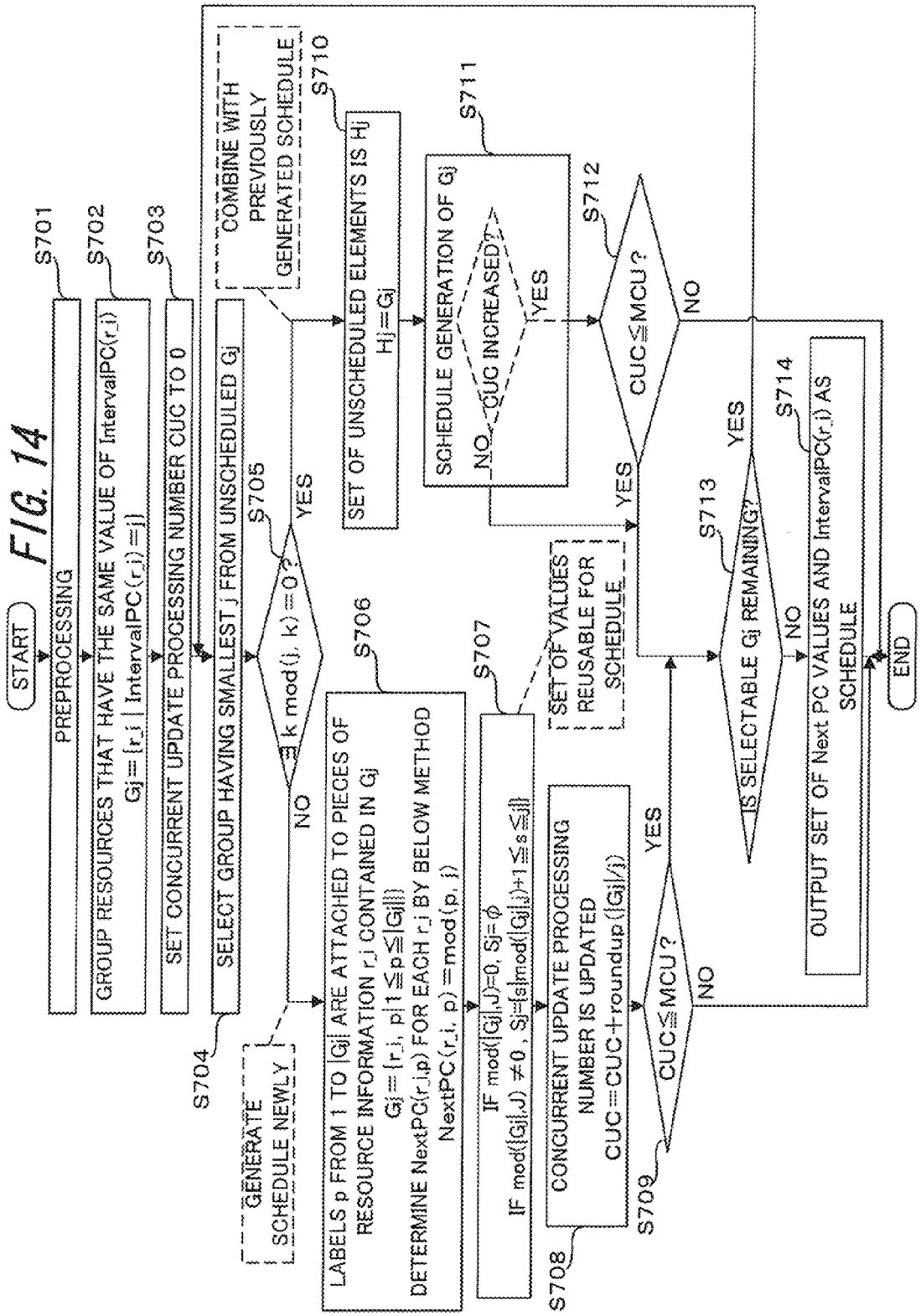
FIG. 14 is a flow chart showing a processing example of a collection schedule generating unit according to a second example.

A process executed by the collection schedule generating unit 25 according to a present example is shown in the flow chart of FIG. 14. As a presupposition of the process, it is assumed that, as shown in FIG. 2, the update interval 501 of the resource information r_i serving as a collection target, the concurrent update processing number MCU 502, and the polling time interval PI 503 are stored in the condition storage unit 27.

[Preprocessing]

First, the collection schedule generating unit 25 carries out preprocessing similar to that of the first example, thereby obtaining the least common multiple LCMI (Least Common Multiple Interval) of the update intervals IntervalPC(r_i) and IntervalPC(r_i) (step S701). As well as the first example, the collection schedule generating unit 25 groups the resource information that has the same value of IntervalPC(r_i), and the groups grouped by IntervalPC(r_i)=j are Gj (step S702).

Next, the collection schedule generating unit 25 sets a counter CUC (Concurrent Update Count) for counting the concurrent update processing number to a default 0 (step S703). The collection schedule generating unit 25 selects the group having the smallest j value from the groups Gj in order to determine schedules in the ascending order of the values of j of all Gj (step S704). As is described later, the restriction of the concurrent update processing number MCU is checked in the stage in which the collection schedule generating unit 25 generates an information collection schedule of each group. Then, when the collection schedule generating unit 25 completes all schedule generation processes without finishing in the middle of the processes, a final information collection schedule is output to finish the process.

After selecting one group Gj, the collection schedule generating unit 25 checks if there is any k by which j is divisible with respect to Gk (k<j) for which schedule(s) has been determined before (step S705). In the case of mod(j,k)=0, in other words, if j is divisible by k, the collection schedule generating unit 25 advances the process to step S710. In other cases (including the case of Gk=φ (empty set)), the collection schedule generating unit 25 advances the process to step S706.

In step S706, since the update interval PC values k and j are relatively prime, the collection schedule of Gj cannot be combined with any of the collection schedules of Gk. Also in the case of Gk=φ (empty set), the collection schedule generating unit 25 has to newly generate a schedule.

Therefore, first, labels p from 1 to |Gj| are attached to the pieces of resource information r_i contained in Gj.

$$Gj=\{r\_i,p|1\leq p\leq|Gj|\} \quad (9)$$

Then, NextPC(r_i,p) is determined for each r_i by the next expression.

$$\text{NextPC}(r\_i,p)=\mod(p,j) \quad (10)$$

Herein, in the case of mod(|Gj|,j)≠0, the schedule includes gaps, and the schedule of the group having the IntervalPC value including j as a factor can be combined. Then, the values from mod(|Gj|,j)+1 to j which can be set as the NextPC values are retained as a set Sj (step S707).

$$Sj=\{s|\mod(|Gj|,j)+1\leq s\leq j\} \quad (11)$$

In the case of mod(|Gj|,j)=0, Sj is φ (empty set). As is described later, elements which are used in later processes are removed from Sj.

Next, since the largest concurrent update processing number of the group Gj is roundup(|Gj|/j), this value is added to the counter CUC (step S708).

$$CUC=CUC+\text{roundup}(|Gj|/j) \quad (12)$$

The counter CUC and the concurrent update processing number MCU are compared with each other (step S709). When CUC is larger than MCU, the collection schedule generating unit 25 determines that the schedule cannot be generated and finishes the process.

On the other hand, when the counter CUC and the concurrent update processing number MCU are in the relation that CUC is equal to or smaller than MCU, the collection schedule generating unit 25 advances the process to step S713.

In step S710, since the update interval PC value j is divisible by k, the collection schedule of Gj can be generated in combination with the collection schedule of Gk. Therefore, the collection schedule generating unit 25 sets Hj as the set of the elements of Gj for which collection schedule has not been determined, in other words, the elements of which NextPC (r_i) values have not been determined and advances the process to step S711.

$$Hj=Gj \quad (13)$$

In step S711, the collection schedule generating unit 25 tries the process of generating the collection schedule of Gj by combining the schedule with the collection schedule of other groups (details will be described later). When the collection schedule generating unit 25 can generate the collection schedule of all the elements of Gj by utilizing the collection schedule of other groups, the counter CUC is not increased.

On the other hand, when the collection schedule generating unit 25 generates a new collection schedule for the reason that the collection schedule of the other groups cannot be utilized for at least part of the elements, the counter CUC is increased. The collection schedule generating unit 25 advances the process to step S712 when the counter CUC is increased, and the collection schedule generating unit 25 advances the process to step S713 when the counter CUC is not increased.

In step S712, the counter CUC and the concurrent update processing number MCU are compared with each other. When CUC is larger than MCU, the collection schedule generating unit 25 determines that the collection schedule cannot be generated and finishes the process.

When the counter CUC and the concurrent update processing number MCU are in the relation that CUC is equal to or less than MCU, the collection schedule generating unit 25 advances the process to step S713.

In step S713, the collection schedule generating unit 25 determines whether any selectable Gj is remaining or not.

When the selectable Gj is remaining, the collection schedule generating unit 25 returns to step S704 and repeats the process same as the above described process.

On the other hand, when no selectable Gj is remaining, the collection schedule generating unit 25 stores the set of the NextPC values and IntervalPC(r_i) of the resource information, which have been generated until this point, as a schedule in the collection schedule storage unit 26 (step S714) and finishes the process.

Figure 15:
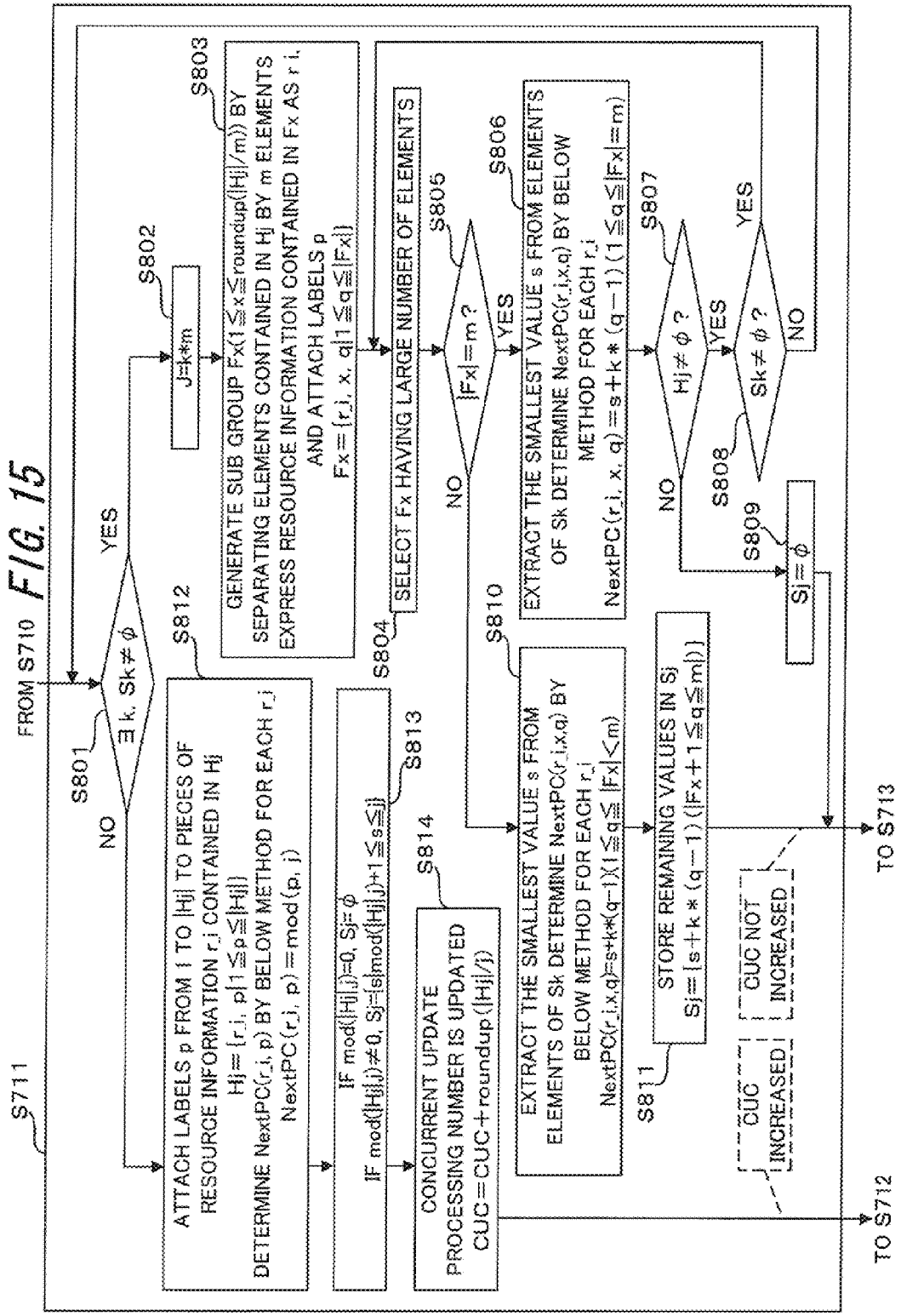
FIG. 15 is a flow chart showing a processing example of the collection schedule generating unit according to the second example.

The details of the process of step S711 are shown in FIG. 15. The collection schedule generating unit 25 selects Gk in the ascending order of k from unexamined Gk and checks whether there is allowance to add a schedule or not.

In the case of Sk≠ϕ (in other words, when Sk has element (s)) (step S801: YES), the collection schedule generating unit 25 advances the process to step S802.

In the case of Sk=ϕ (empty set) with respect to all Gk (step S801: NO), the collection schedule generating unit 25 advances the process to step S812.

When the process advances to step S802, the collection schedule generating unit 25 can generate the collection schedule of the resource information r_i corresponding to part or all of the elements of Gj in combination with the collection schedule of Gk. In this case, since j is divisible by k, j is expressed as j=k*m. The collection schedule generating unit 25 determines the NextPC(r_i) values of the resource information r_i corresponding to the elements contained in Hj by using the elements of Sk.

The collection schedule generating unit 25 generates a sub group(s) Fx(1≦x≦roundup(|Hj|/m)) by separating the elements contained in Hj by m elements, expresses the elements contained in Fx as r_i,x, and attaches labels q from 1 to |Fx| thereto (step S803).

$$Fx=\{r\_i,x,q | 1 \leq q \leq |Fx|\} \quad (14)$$

Next, the collection schedule generating unit 25 selects Fx having a large number of elements (step S084) and checks whether the number of elements of selected Fx is m or not (step S805). When |Fx| is equal to m, the collection schedule generating unit 25 advances the process to step S806; and, when |Fx| is smaller than m, the collection schedule generating unit 25 advances the process to step S810.

In step S806, the collection schedule generating unit 25 determines the values of NextPC(r_i,x,q) of the elements of selected Fx. Specifically, the smallest value s is extracted from the elements of Sk, and a value smaller than j among the values obtained by adding an integral multiple of k to s is set as NextPC(r_i,x,q).

$$NextPC(r\_i,x,q)=s+k*(q-1)(1\leq q \leq |Fx|=m) \quad (15)$$

The element of Sk extracted in this process is removed from Sk.

Next, the collection schedule generating unit 25 checks whether any element of Gj for which collection schedule is not determined is remaining or not (step S807). In the case of Hj≠ϕ, in other words, when it is remaining, the collection schedule generating unit 25 advances the process to step S808, and, when Hj=ϕ (empty set), in other words, when the schedule generation process of Gj is completed, advances the process to step S809.

In step S808, the collection schedule generating unit 25 checks whether any element is remaining in Sk or not. In the case of Sk≠ϕ, the collection schedule generating unit 25 returns the process to step S804, wherein the collection schedule generating unit 25 selects Fx having a large number of elements and repeats the process same as the above described process. In the case of Sk=ϕ (empty set), the collection schedule generating unit 25 returns the process to step S801.

In step S809, Sj is equal to ϕ since the collection schedule of Gj has been generated by using the elements of Sk, and usable numeric values have not been newly generated as the NextPC(r_i) values. Then, the collection schedule generating unit 25 advances the process to step S713.

In step S810, the collection schedule generating unit 25 determines NextPC(r_i,x,q) values in the below manner with respect to the elements of selected Fx. Herein, the sub group which satisfies |Fx|<m is at most one, and the one having a large number of elements are selected and processed first; therefore, Fx is the last sub group.

First, the collection schedule generating unit 25 extracts the smallest value s from the elements of Sk. Then, a value smaller than j among the values obtained by adding an integral multiple of k to s is set as NextPC(r_i,x,q).

$$NextPC(r\_i,x,q)=s+k*(q-1)(1\leq q \leq |Fx|<m) \quad (16)$$

At this point, the values of s+k*(q-1)(|Fx|+1≦q≦m) are left unutilized even though they can be set as NextPC. When these values are used, the group(s) having the IntervalPC value including j as a factor may be scheduled. Therefore, these values are retained as Sj (step S811).

$$Sj=\{s+k*(q-1)(|Fx|+1 \leq q \leq m)\} \quad (17)$$

Since Hj is Hj=ϕ (empty set) and the schedule for Gj is completed, the collection schedule generating unit 25 advances the process to step S713.

In step S812, since examination of all the schedules of Gk which can be combined has been finished, the collection schedule generating unit 25 generates the collection schedule of the remaining element Hj. First, labels p from 1 to |Hj| are attached to the pieces of resource information r_i contained in Hj.

$$Hj=\{r\_i,p | 1 \leq p \leq |Hj|\} \quad (18)$$

Next, NextPC(r_i,p) of each of r_i is determined by the below expression.

$$NextPC(r\_i,p)=\mod(p,j) \quad (19)$$

Herein, in the case of mod(|Hj|,j)≠0, the schedule includes gaps; therefore, the group having the IntervalPC value including j as a factor may be scheduled. Therefore, the values from mod(|Hj|,j)+1 to j which can be set as the NextPC values are retained as a set Sj (step S813).

$$Sj=\{s | \mod(|Hj|,j)+1 \leq s \leq j\} \quad (20)$$

In the case of mod(|Hj|,j)=0, Sj is equal to ϕ (empty set). The elements utilized in later processes are extracted from Sj.

Next, the largest concurrent update processing number of the group Gj becomes roundup(|Hj|/j). Therefore, the collection schedule generating unit 25 adds roundup(|Hj|/j) to the counter CUC (step S814). Then, the collection schedule generating unit 25 advances the process to step S712.

$$CUC=CUC+roundup(|Hj|/j) \quad (21)$$

Next, an example of generating a schedule, which is more optimal than the schedule generated in the first example, by using the above described method will be shown.

Figure 16:
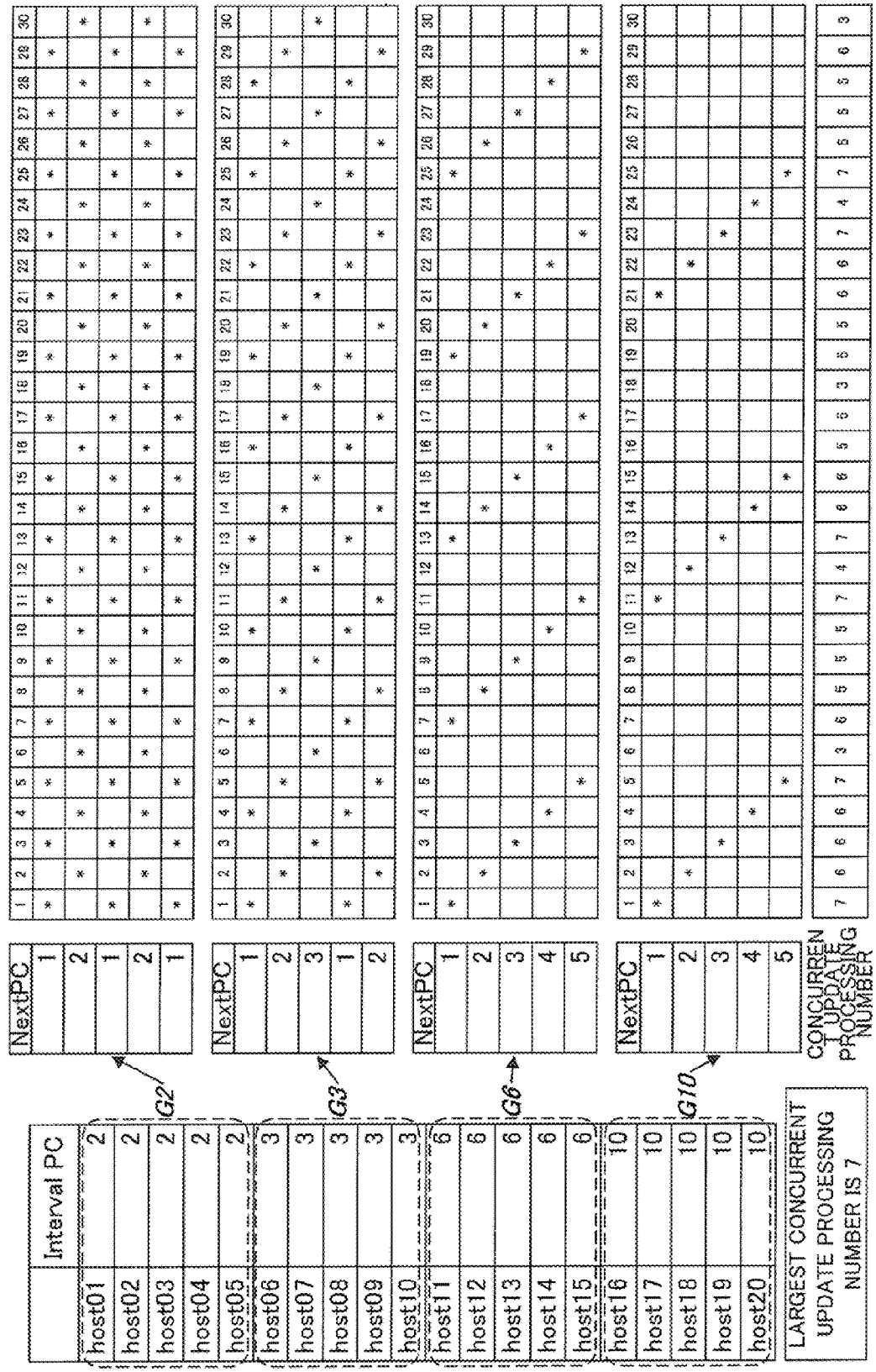
FIG. 16 is a diagram showing a still another example of the collection schedule generated by the collection schedule generating unit according to the first example.

The case in which resource information has the update interval PC values of 2, 3, 6, and 10, wherein the information of each value includes five pieces of information, is considered. When the resource information having the same value as the update interval PC values is grouped into groups G2, G3, G6, and G10 and the first example is applied, as shown in FIG. 16, collection schedules are generated for the groups, respectively. As a result, the largest concurrent update processing number becomes 7. If a collection process is carried out without scheduling, the largest concurrent update processing number becomes 20 in some cases; therefore, the schedules generated in the first example is sufficiently practical. However, since the update interval PC values are not relatively prime or prime numbers, optimal schedules are not always generated by the schedule generating method shown in the first example. Therefore, when the method of the present second example is employed, more optimal collection schedules are generated.

Figure 17:
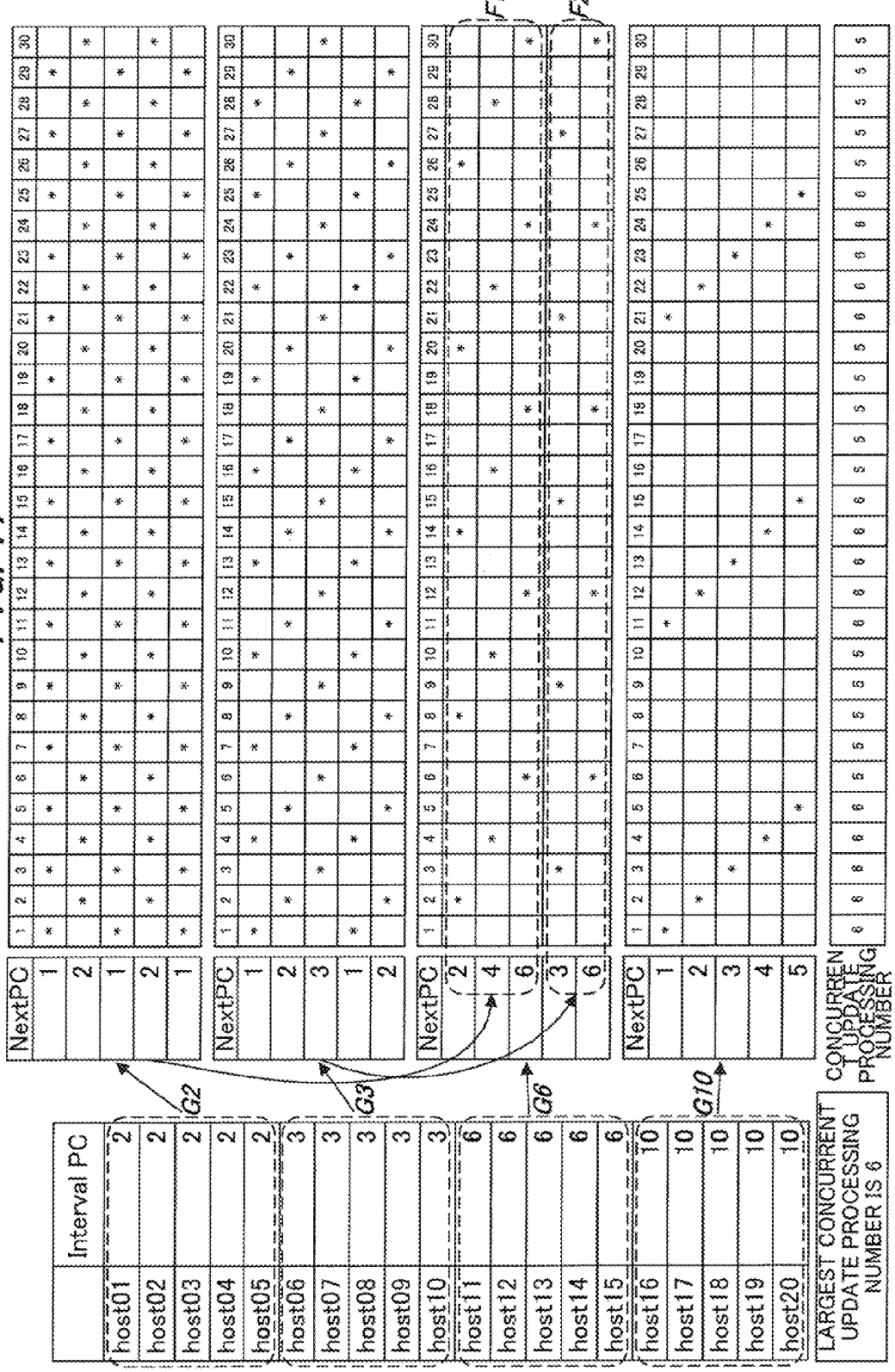
FIG. 17 is a diagram showing an example of a collection schedule generated by the collection schedule generating unit according to the second example.

As shown in FIG. 17, the collection schedule generating unit 25 groups the resource information based on the update interval PC values as well as the first example. First, the collection schedule generating unit 25 generates a collection schedule of G2 having the smallest update interval PC value. In the case of G2, there is no group for which a collection schedule has been generated previously; therefore, the collection schedule generating unit 25 generates the collection schedule of G2 by the same procedure as the first example. The collection schedule of G2 generated by the collection schedule generating unit 25 is as shown in FIG. 17. In the generated collection schedule of G2, the largest value of the concurrent update processing number is 3; however, the part at which the concurrent update processing number is 2 is also present. In other words, since the collection schedule of G2 has allowance, another piece of resource information having 2 as the update interval PC value can be incorporated into the collection schedule by setting a next update interval value 2. Therefore, the collection schedule generating unit 25 stores the next update interval value 2 in the set of S2.

Next, the collection schedule generating unit 25 generates a collection schedule of G3. At the point when the collection schedule of G3 is to be generated, the collection schedule of G2 has already been generated. However, since mod(3,2) is not equal to 0, the collection schedule generating unit 25 also generates the collection schedule of G3. The collection schedule of G3 generated by the collection schedule generating unit 25 is shown in FIG. 17. The largest concurrent update processing number of the generated collection schedule of G3 is 2, and the collection schedule of G3 has allowance. Therefore, another piece of resource information having 3 as the update interval PC value can be incorporated into the collection schedule by setting a next update interval value 3. Therefore, the collection schedule generating unit 25 stores the next update interval value 3 in the set of S3.

Next, the collection schedule generating unit 25 generates a collection schedule of G6. At this point, generation of the schedules of G2 and G3 has been completed, and mod(6,2) is equal to 0; therefore, a method of combining the schedule with the collection schedule of G2 is sought. Since S2 is not equal to φ, the allowance of the collection schedule of G2 can be utilized.

First, G6 is considered to be equal to H6. Since j is equal to 6 and k is equal to 2, m is equal to 3. The elements of H6 are separated by three to generate two sub groups F1 and F2. In the case of |F1|=3 and |F2|=2, |F1| is selected first. In S2, only one value 2 is stored by the previous process. By utilizing this, next update PC values are set for the elements of F1 as shown in FIG. 17. In this process, the values 2, 4, and 6 are set for the three elements of F1, respectively. Through this operation, S2 becomes equal to φ (empty set); therefore, the other Gk is checked. At this point, the number of elements of H6 has been reduced from 5 to 2 (|H6|−|F3|=5−3=2).

Since mod(6,3) is equal to 0, a combination with the collection schedule of G3 is conceivable. S3 is also S3≠φ. Since j is equal to 6 and k is equal to 3, m is equal to 2. When the number of elements of H6 is separated by two, only one sub group F2 is generated. Since only one value 3 has been stored in S3 by the previous process, as shown in FIG. 17, the next update PC values of the elements of F2 are set to 3 and 6, respectively, by utilizing the value. Through this operation, H6 becomes equal to φ (empty set), and the collection schedule has been determined for all the elements of G6. Since S6 is equal to φ (empty set), the scheduling process for G6 is finished. The concurrent update processing number is not increased.

Lastly, a collection schedule in the groups is generated for G10. Although mod(10,2) is obtained, S2 is equal to φ (empty set); therefore, the collection schedule cannot be combined. Therefore, the collection schedule generating unit 25 generates a schedule by the procedure same as the first example. The result is shown in FIG. 17.

In the collection schedule completed in the above process, the largest concurrent update processing number is 6, which is a smaller value compared with the largest concurrent update processing number of the collection schedule generated by the method of the first example shown in FIG. 16. Theoretically, it can be proved that the largest concurrent update processing number cannot be reduced to 6 or less; therefore, in this case, the optimal collection schedule was generated.

The collection schedule generating units 25 and 35 can be utilized upon generation of a collection schedule that is stored for the first time in the collection schedule storage unit 26 or 36 and, in addition, can be utilized when a collection schedule is to be generated again by the change unit 24b or 34b.

Next, effects of the present embodiment will be explained.

According to the present embodiment, in a resource information providing system in which resource information providing apparatuses are hierarchized in many levels, the freshness of resource information provided to a search request source can be adjusted to satisfy requested freshness.

When an elapsed time specifying request specifying the maximum allowable elapsed time t_req with respect to the resource information X is input to the system, whether the largest elapsed time t_max of the resource information X is exceeding t_req or not is determined. When the maximum elapsed time t_max of the resource information X is exceeding t_req, the resource information providing apparatuses capable of shortening the collection interval of the resource information X by at least the amount of excess are preferentially selected in the order, the closest to the search client 1 first from the resource information providing apparatuses 2 and 3, which are present on the transmission path of the resource information X. Then, in the selected resource information providing apparatus, the collection interval of the resource information X is shortened. Therefore, in this system, the freshness of the resource information provided to the search request source can be adjusted to satisfy the requested freshness.

Moreover, according to the present embodiment, the collection load can be reduced as much as possible within the range that satisfies the update intervals upon change of the collection intervals.

This is for the reason that the collection schedule having small unevenness in the concurrent update processing number can be generated by sorting plural pieces of resource information based on the values of the update intervals and generating collection schedules for the groups, respectively, the collection groups are of the resource information belonging to the groups.

Second Embodiment

Figure 18:
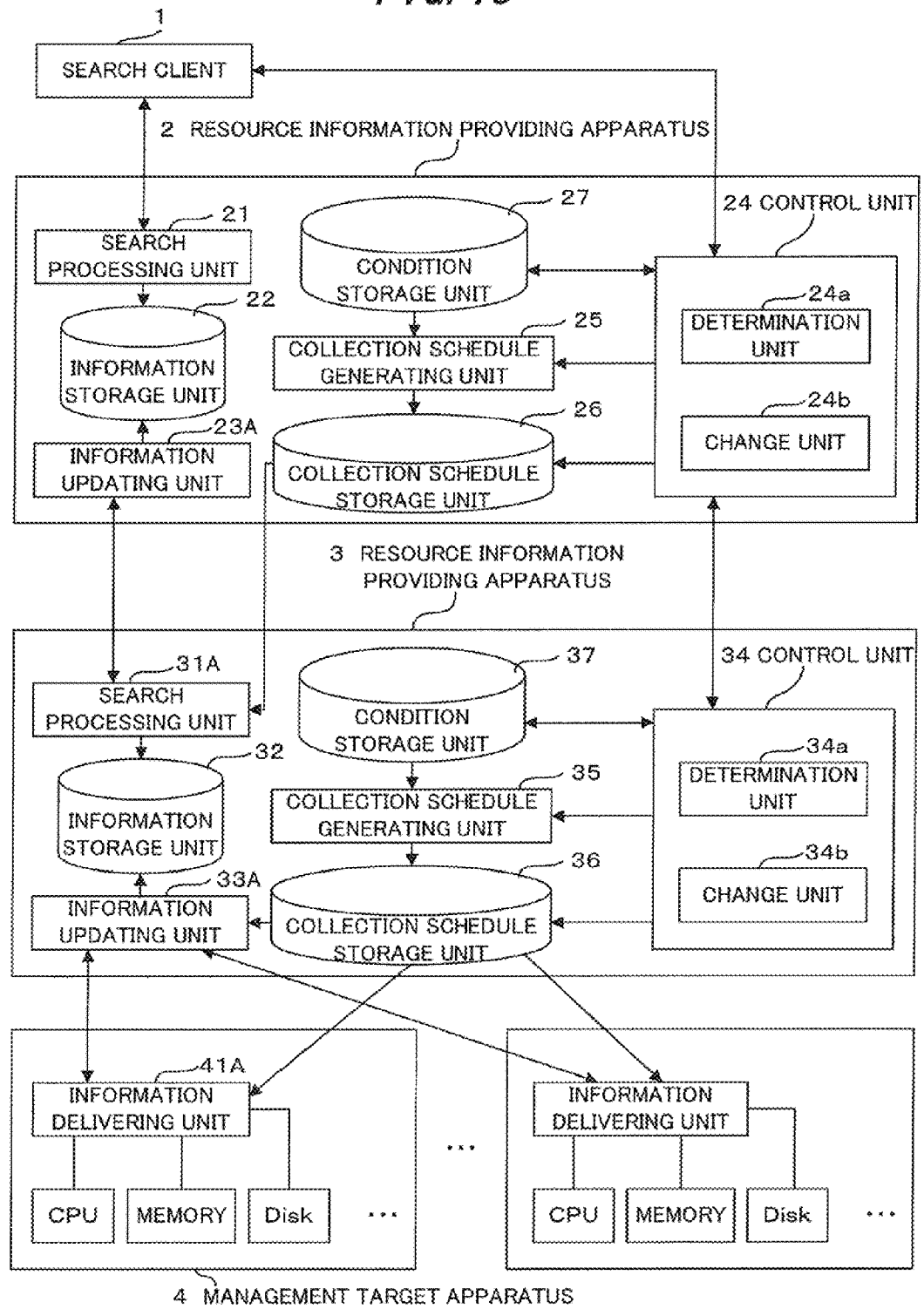
FIG. 18 is a block diagram of a resource information providing system according to a second embodiment of the present invention.

Referencing to FIG. 18, a resource information providing system according to a second embodiment of the present invention is different compared with the resource information providing system according to the first embodiment shown in FIG. 1 in the points that the resource information providing apparatus 2 has an information updating unit 23A instead of the information collecting unit 23, that the resource information providing apparatus 3 has an information delivering unit 31A and an information updating unit 33A instead of the search processing unit 31 and the information collecting unit 33, and that the management target apparatus 4 has an information delivering unit 41A instead of the information providing unit 41.

In the first embodiment shown in FIG. 1, the information providing unit 41 transmits the resource information stored in the management target apparatus 4 to the information collecting unit 33 at the point when the information providing unit 41 of the management target apparatus 4 receives a resource acquisition request from the information collecting unit 33 of the resource information providing apparatus 3.

On the other hand, in the present embodiment, the collection schedule storage unit 36 transmits the collection schedule stored in the collection schedule storage unit 36 of the resource information providing apparatus 3 to the information delivering unit 41A of the management target apparatus 4. Then, in accordance with the received collection schedule, the information delivering unit 41A periodically acquires the resource information stored in the management target apparatus 4 and transmits the information to the information updating unit 33A of the resource information providing apparatus 3; and the information updating unit 33A stores (cache) the received resource information in the information storage unit 32.

Moreover, in the first embodiment shown in FIG. 1, the resource information stored in the information storage unit 32 is transmitted to the information collecting unit 23 at the point when the search processing unit 31 of the resource information providing apparatus 3 in the lower level of hierarchy receives a search request from the information collecting unit 23 of the resource information providing apparatus 2 in the upper level of hierarchy.

On the other hand, in the present embodiment, the collection schedule stored in the collection schedule storage unit 26 of the resource information providing apparatus 2 is transmitted to the information delivering unit 31A of the resource information providing apparatus 3. Then, in accordance with the received collection schedule, the information delivering unit 31A periodically transmits the resource information stored in the information storage unit 32 to the information updating unit 23A of the resource information providing apparatus 2, and the information updating unit 23A stores (cache) the received resource information to the information storage unit 22.

In this manner, the present embodiment is different in the points that the resource information is delivered from the management target apparatus 4 to the resource information providing apparatus 3 in the lower level of hierarchy and that the resource information is delivered from the resource information providing apparatus 3 in the lower level of hierarchy to the resource information providing apparatus 2 in the upper level of hierarchy. The other configuration including the control units 24 and 34 and operations are same as the first embodiment.

According to the present embodiment, even when an existing resource information providing system is realized by an information delivering method, the freshness of the resource information can be ensured for the search client 1 only by introducing the control units 24 and 34.

The embodiments of the present invention have been described above. However, the present invention is not limited to the above examples, and various addition and modifications can be made.

For example, the above described embodiments take the simple system configuration having one search client 1 and two resource information providing apparatus as an example. However, the present invention is not limited to such an example; and, for example as shown in FIG. 19, the present invention can be applied to a resource information providing apparatus having two or more search clients and three or more resource information providing apparatuses.

Figure 19:
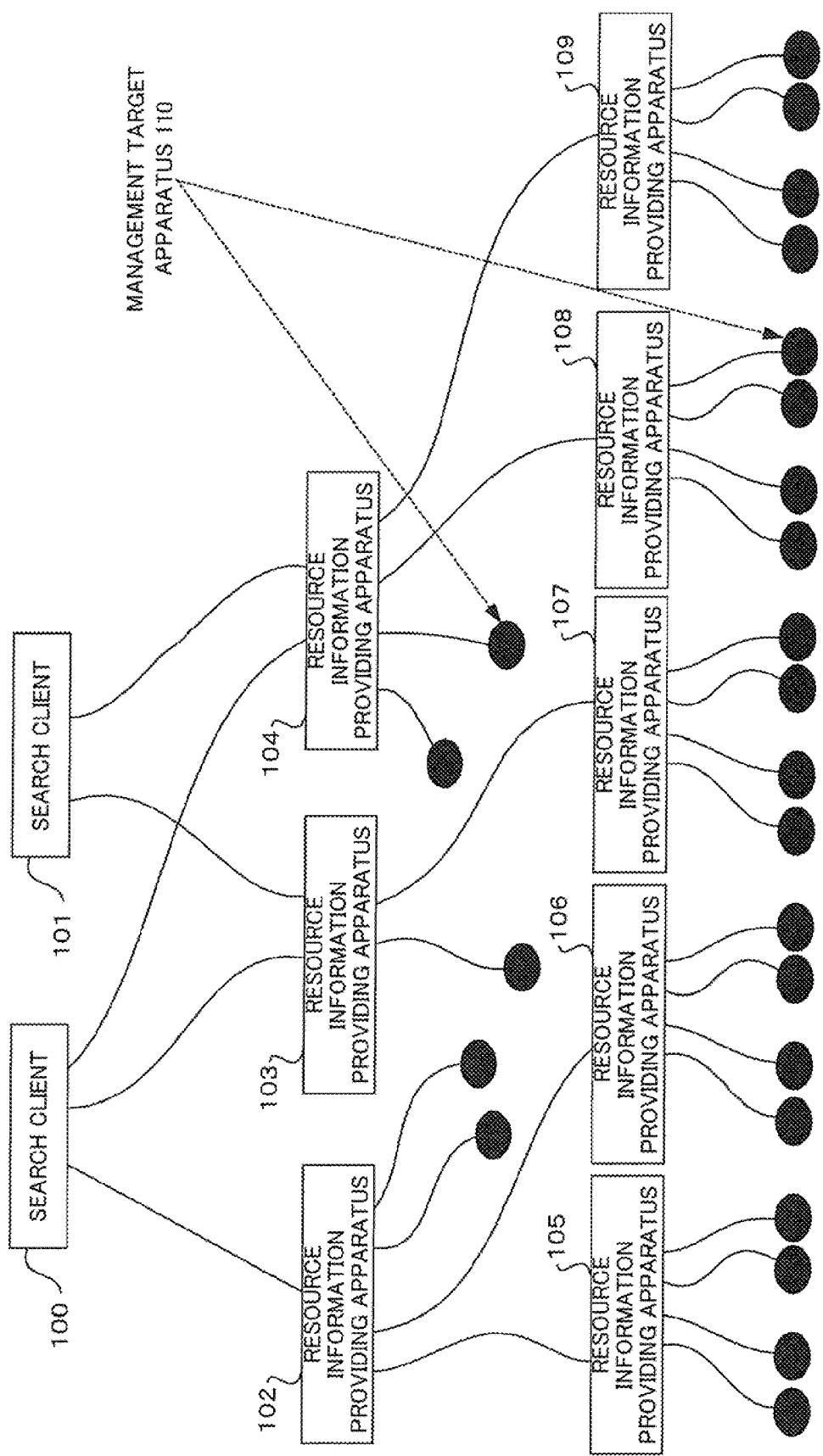
FIG. 19 is a block diagram of a resource information providing system according to another embodiment of the present invention.

In FIG. 19, the maximum number of the resource information providing apparatuses 102 to 109, which are interposed on the information transmission path from search clients 100 and 101 to a management target apparatus 100, is two; however, the present invention can be also applied to a resource information providing system in which three or more resource information providing apparatuses are interposed.

When elapsed time specifying requests specifying different maximum allowable elapsed time t_req with respect to the same resource information X are output at the same time from the plurality of search clients 100 and 101 to the same resource information providing apparatus (resource information providing apparatus 103 or 104), the collection interval is shortened based on the maximum allowable elapsed time t_req of harder conditions. For example, when the search client 100 requests t_req=5 seconds and the search client 101 requests t_req=3 seconds, the collection interval is shortened so that t_req=3 seconds is satisfied.

Furthermore, as a matter of course, the functions that the resource information collecting apparatuses of the present invention have can be realized in terms of hardware or realized by computers and programs. The program is provided in the manner that they are recorded in computer readable media such as magnetic disks or semiconductor memories. The programs are read by the computers when the computers are started up and the like, and control the operations of the computers, thereby causing the computers to function as the collection schedule generating units 25 and 35, the control units 24 and 34, the search processing units 21 and 31, the information collecting units 23 and 33, the information updating units 23A and 33A, and the information delivering unit 31A of the resource information providing apparatuses of the above described embodiments and causing the computers to execute the processes shown in FIG. 5 to FIG. 7, FIG. 9 to FIG. 11, FIG. 14, and FIG. 15.

Industrial Applicability

The present invention can be applied for uses such as an integrated monitoring system which monitors the configurations and state of a distributed system. The present invention can be also applied to a use that improves accuracy and reliability of autonomous operation management in management middleware for autonomous operation which establishes autonomy of manually-operated system operation management.

The invention claimed is:

1. A resource information providing system comprising:
a management target apparatus storing resource information in a memory;
a plurality of resource information providing apparatuses periodically collecting the pieces of resource information from the management target apparatus, storing the pieces of resource information, and being hierarchized on a transmission path of the resource information from the management target apparatus to a request source which requests the resource information; and
a control unit of,
when maximum elapsed time from acquisition of the resource information by the management target apparatus until arrival of the information to the request source is exceeding maximum allowable elapsed time specified by the request source,
shortening a collection interval, at which the resource information providing apparatus collects the pieces of resource information from the management target apparatus, by the time obtained by subtracting the maximum allowable elapsed time from the maximum elapsed time.

2. A resource information providing system comprising:
a management target apparatus storing pieces of resource information in a memory;
a plurality of resource information providing apparatuses periodically collecting the pieces of resource information from the management target apparatus, storing the resource information in a cache, and being hierarchized on a transmission path of the resource information from the management target apparatus to a request source which requests the resource information; and
a control unit of,
when maximum elapsed time from acquisition of the resource information by the management target apparatus until arrival of the information to the request source is exceeding maximum allowable elapsed time specified by the request source,
selecting the resource information providing apparatus capable of shortening a collection interval, at which the resource information providing apparatus collects the pieces of resource information from the management target apparatus, by at least the time obtained by subtracting the maximum allowable elapsed time from the maximum elapsed time and
shortening the collection interval of the resource information in the selected resource information providing apparatus.

3. The resource information providing system according to claim 2, wherein
a time interval of activating an information collecting process by polling is PI,
a number of activation of polling is PC,
a PC value of next update is NextPC($r\_i$), and
an update interval PC value for repeating update is IntevalPC($r\_i$);
resource information $r\_i$ is collected by any of polling processes;
the resource information providing apparatus has
a collection schedule storing unit of storing, as a collection schedule, NextPC($r\_i$) and IntervalPC($r\_i$) simultaneously satisfying a concurrent update processing restriction and an update interval of the information providing apparatus, the concurrent update processing restriction restricting a maximum value of the number of pieces of resource information collected in one polling to equal to or less than an upper limit value which is set in advance; and
the control unit shortens IntervalPC($r\_i$) of the resource information in the selected resource information providing apparatus.

4. The resource information providing system according to claim 3, wherein
the resource information providing system has a collection schedule generating unit which sorts the pieces of resource information having same values of the update intervals into same groups, respectively, and generates a collection schedule for the groups, respectively, the collection schedules are of the resource information belonging to the groups; and
the control unit generates the collection schedules again by the collection schedule generating unit.

5. The resource information providing system according to claim 4, wherein
the collection schedule generating unit examines whether the maximum value of the number of pieces of resource information collected in one polling in the generated collection schedule is equal to or less than the upper limit value which is set in advance or not.

6. The resource information providing system according to claim 4, wherein
the collection schedule generating unit
imparts serial label values p to the resource information belonging to each group and
causes a remainder of division of the label value p by the update interval of the group to serve as NextPC($r_{13}i$) corresponding to the resource information $r\_i$ having the label value p.

7. The resource information providing system according to claim 4, wherein
the values of the update intervals owned by the resource information are restricted to be relatively prime.

8. The resource information providing system according to claim 4, wherein
the value of the update interval owned by the resource information is a prime number.

9. The resource information providing system according to claim 4, wherein
the collection schedule generating unit
imparts order to the groups in the ascending order of the values of the update intervals owned by the groups,
generates collection schedules of the groups in the ascending order of the imparted order, and
utilizes empty space, which is generated in the collection schedule of the group having k as the value of the update interval, in generation of a collection schedule of the group having a value of the update interval which is an integral multiple of k.

10. A resource information providing method of a resource information providing system in which a plurality of resource information providing apparatuses are hierarchized, the resource information providing apparatuses periodically collecting pieces of resource information stored in a management target apparatus and accumulating the information in a cache, the resource information providing method including:
a first step of determining whether maximum elapsed time from acquisition of the resource information by the management target apparatus until arrival of the information to a request source requesting the resource information is exceeding maximum allowable elapsed time, which is set in advance, or not by a control unit; and a second step of, when the maximum elapsed time is determined to be exceeding the maximum allowable elapsed time by the control unit selecting the resource information providing apparatus from the plurality of resource information providing apparatuses present on a transmission path of the resource information to the request source, the selected resource information providing apparatus being capable of shortening a collection interval, at which the resource information providing apparatus collects the pieces of resource information from the management target apparatus, by the time obtained by subtracting the maximum allowable elapsed time from the maximum elapsed time, and shortening the collection interval of the resource information in the selected resource information providing apparatus.

11. A resource information providing apparatus periodically collecting pieces of resource information of a management target apparatus and accumulating the information in a cache, the resource information providing apparatus comprising:

a determination unit of determining whether maximum elapsed time from acquisition of the resource information by the management target apparatus until arrival of the information to a request source via the resource information providing apparatus is exceeding the maximum allowable elapsed time or not; and a changing unit of, when the maximum elapsed time is determined to be exceeding the maximum allowable elapsed time by the determination unit, determining whether a collection interval of the resource information in the resource information providing apparatus can be shortened at least by the time obtained by subtracting the maximum allowable elapsed time from the maximum elapsed time or not, and, when the collection interval can be shortened, shortening the collection interval of the resource information; wherein when the resource information is acquired from other resource information providing apparatus and it is determined by the determination unit that the collection interval of the resource information cannot be shorted, the changing unit transmits a collection interval shortening request to the other resource information providing apparatus, the collection interval shortening request requesting to shorten the collection interval, at which the resource information is collected by the other resource information providing apparatus, by the time obtained by subtracting the maximum allowable elapsed time from the maximum elapsed time.

12. A non-transitory recording medium storing a program causing a computer of a resource information providing apparatus, which periodically collects pieces of resource information of a management target apparatus and accumulates the information in a cache, to function as a determination unit of determining whether maximum elapsed time from acquisition of the resource information by the management target apparatus until arrival of the information to a request source requesting the resource information via the resource information providing apparatus is exceeding the maximum allowable elapsed time, which is set in advance, or not; and a changing unit of, when the maximum elapsed time is determined to be exceeding the maximum allowable elapsed time by the determination unit, determining whether a collection interval of the resource information in the resource information providing apparatus can be shortened at least by the time obtained by subtracting the maximum allowable elapsed time from the maximum elapsed time or not, and, when the collection interval can be shortened, shortening the collection interval of the resource information; wherein when the resource information is acquired from other resource information providing apparatus and it is determined by the determination unit that the collection interval of the resource information cannot be shortened, the changing unit transmits a collection interval shortening request to the other resource information providing apparatus, the collection interval shortening request requesting to shorten the collection interval, at which the pieces of resource information are collected by the other resource information providing apparatus, by the time obtained by subtracting the maximum allowable elapsed time from the maximum elapsed time.

13. A resource information providing system comprising:

a management target apparatus storing resource information in a memory;

a plurality of resource information providing apparatuses periodically collecting the pieces of resource information from the management target apparatus, storing the pieces of resource information, and being hierarchized on a transmission path of the resource information from the management target apparatus to a request source which requests the resource information; and a control means of, when maximum elapsed time from acquisition of the resource information by the management target apparatus until arrival of the information to the request source is exceeding maximum allowable elapsed time specified by the request source, shortening a collection interval, at which the resource information providing apparatus collects the pieces of resource information from the management target apparatus, by the time obtained by subtracting the maximum allowable elapsed time from the maximum elapsed time.

* * * * *